United States Patent
Dorner et al.

(10) Patent No.: US 10,223,427 B1
(45) Date of Patent: *Mar. 5, 2019

(54) BUILDING A PALETTE OF COLORS BASED ON HUMAN COLOR PREFERENCES

(71) Applicant: Amazon Technologies, Inc., Reno, NV (US)

(72) Inventors: Charles Shearer Dorner, Seattle, WA (US); Jenny Ann Blackburn, Seattle, WA (US); Eva Manolis, Bellevue, WA (US); Timothy Andrew Ong, Sammamish, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 981 days.

This patent is subject to a terminal disclaimer.

(21) Appl. No.: 14/316,292

(22) Filed: Jun. 26, 2014

(51) Int. Cl.
*G06F 17/30* (2006.01)

(52) U.S. Cl.
CPC ...... *G06F 17/3053* (2013.01); *G06F 17/3025* (2013.01)

(58) Field of Classification Search
CPC .................................................. G06F 17/3025
See application file for complete search history.

(56) References Cited

U.S. PATENT DOCUMENTS

| | | | |
|---|---|---|---|
| 5,508,718 A | 4/1996 | Haikin | |
| 5,544,284 A | 8/1996 | Allebach et al. | |
| 5,684,895 A | 11/1997 | Harrington | |
| 5,822,503 A | 10/1998 | Gass, Jr. et al. | |
| 6,014,125 A | 1/2000 | Herbert | |
| 6,041,311 A | 3/2000 | Chislenko et al. | |
| 6,081,276 A | 6/2000 | Delp | |
| 6,124,945 A | 9/2000 | Ishihara et al. | |

(Continued)

FOREIGN PATENT DOCUMENTS

| | | |
|---|---|---|
| CN | 107077474 A | 8/2017 |
| CN | 107077698 A | 8/2017 |

(Continued)

OTHER PUBLICATIONS

Balasubramanian, Raja, et al.; Sequential Scalar Quantization of Color Images, Journal of Electronic Imaging, vol. 3, No. 1, pp. 45-59; Jan. 1994.

(Continued)

*Primary Examiner* — Amanda L Willis
(74) *Attorney, Agent, or Firm* — Knobbe, Martens, Olson & Bear, LLP

(57) ABSTRACT

Systems and methods are described to generate a color palette with color combinations based on human color preferences. One or more input colors can be used to determine affiliated colors based on the presence of colors in color palettes that have been voted on and/or ranked by a community of users. Each affiliated color can be weighted, normalized, and ordered based at least in part on the level of preference for the color palette to which it belongs and the relative popularity of the input colors. A color from the ordered affiliated colors can be selected and added to the custom palette of colors. With the addition of a color, the ordered affiliated colors can be updated to further present colors for inclusion in the custom color palette.

20 Claims, 16 Drawing Sheets

(56) References Cited

U.S. PATENT DOCUMENTS

| | | |
|---|---|---|
| 6,385,336 B1 | 5/2002 | Jin |
| 6,513,014 B1* | 1/2003 | Walker ............ H04N 21/25891 |
| | | 705/1.1 |
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1 | 6/2011 | Remedios |
| 8,393,002 B1 | 3/2013 | Kamvar et al. |
| 8,416,255 B1 | 4/2013 | Gilra |
| 8,553,045 B2 | 10/2013 | Skaff et al. |
| 8,576,241 B1 | 11/2013 | Kanter et al. |
| 8,587,604 B1 | 11/2013 | Kanter et al. |
| 8,593,680 B2 | 11/2013 | Woolfe et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2 | 12/2016 | Sayre et al. |
| 9,542,704 B2 | 1/2017 | Dorner et al. |
| 9,552,656 B2 | 1/2017 | Dorner et al. |
| 9,633,448 B1 | 4/2017 | Dorner |
| 9,652,118 B2 | 5/2017 | Hill et al. |
| 9,652,868 B2 | 5/2017 | Gunningham et al. |
| 9,659,032 B1 | 5/2017 | Dorner et al. |
| 9,679,532 B2 | 6/2017 | Dorner et al. |
| 9,697,573 B1 | 7/2017 | Haitani et al. |
| 9,727,983 B2 | 8/2017 | Dorner et al. |
| 9,741,137 B2 | 8/2017 | Dorner et al. |
| 9,785,649 B1 | 10/2017 | Dorner et al. |
| 9,792,303 B2 | 10/2017 | Sayre, III et al. |
| 9,898,487 B2 | 2/2018 | Sayre, III et al. |
| 9,916,613 B1 | 3/2018 | Dorner et al. |
| 9,922,050 B2 | 3/2018 | Dorner et al. |
| 9,996,579 B2 | 6/2018 | Dorner et al. |
| 10,049,466 B2 | 8/2018 | Dorner et al. |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2003/0083850 A1 | 5/2003 | Schmidt et al. |
| 2003/0142124 A1 | 7/2003 | Takata et al. |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0046424 A1 | 2/2008 | Horton |
| 2008/0069442 A1 | 3/2008 | Itoh |
| 2008/0294600 A1 | 11/2008 | Clark et al. |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1 | 10/2009 | Miller |
| 2009/0259567 A1 | 10/2009 | Watts |
| 2009/0276368 A1 | 11/2009 | Martin et al. |
| 2009/0281925 A1 | 11/2009 | Winter et al. |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0029510 A1 | 2/2011 | Kroon et al. |
| 2011/0135195 A1 | 6/2011 | Marchesotti et al. |
| 2011/0205231 A1 | 8/2011 | Hartley et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1 | 2/2012 | Youngman et al. |
| 2012/0075329 A1 | 3/2012 | Skaff et al. |
| 2012/0099784 A1* | 4/2012 | Marchesotti ........ G06F 17/3025 |
| | | 382/162 |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0159100 A1 | 6/2013 | Raina et al. |
| 2013/0226659 A1* | 8/2013 | Patel ................. G06Q 30/0203 |
| | | 705/7.31 |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2013/0300761 A1 | 11/2013 | Ahmed |
| 2014/0037200 A1 | 2/2014 | Phillips et al. |
| 2014/0037884 A1 | 2/2014 | Wambolt et al. |
| 2014/0044349 A1 | 2/2014 | Wang et al. |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1 | 11/2014 | Bloore et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1 | 11/2015 | Gershon et al. |
| 2015/0356128 A1 | 12/2015 | Nishimura |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379071 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |

(56) References Cited

U.S. PATENT DOCUMENTS

| | | | |
|---|---|---|---|
| 2017/0098314 A1 | 4/2017 | Sayre et al. | |
| 2017/0206061 A1 | 7/2017 | Kumar et al. | |
| 2017/0270620 A1 | 9/2017 | Haitani et al. | |
| 2018/0025002 A1 | 1/2018 | Dorner et al. | |
| 2018/0040142 A1 | 2/2018 | Dorner et al. | |
| 2018/0158128 A1 | 6/2018 | Dorner et al. | |
| 2018/0232414 A1 | 8/2018 | Dorner et al. | |

FOREIGN PATENT DOCUMENTS

| | | |
|---|---|---|
| EP | 3 161 677 | 5/2017 |
| EP | 3 161 770 | 5/2017 |
| JP | 2007-286767 A | 11/2007 |
| JP | 2009-181468 A | 8/2009 |
| JP | 2009-251850 A | 10/2009 |
| JP | 2011-154687 A | 8/2011 |
| JP | 2012-221317 A | 11/2012 |
| JP | 6315524 B2 | 4/2018 |
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

"Color Blind Assistant." iPhone Apps Versions 2.61 and 2.62; Release date Oct. 14-15, 2009; pp. 1-7.
"Color Name & Hue." Wayback Machine Archive; May 16, 2013; pp. 1-17. <http://web.archive.org/web/20130516202647/http://www.color-blindness.com/color-name-hue>.
"HTML Color Picker," Wayback Machine Archive; Feb. 15, 2013; 1 page. <http://web.archive.org/web/20130215181242/http://imagecolorpicker.com/>.
"Tin Eye Labs." Wayback Machine Archive; Sep. 20, 2012; pp. 1-3. <http://web.archive.org/web/20120920051712/http://labs.tineye.com/color/>.
Delon, J., et al., Automatic Color Palette, Proceedings of the International Conference on Image Processing, vol. 2, Sep. 11-14. 2005, pp. 706-709.
Nickerson, D., et al., Central Notations for ISCC-NBS Color Names, Journal of the Optical Society of America, vol. 31; pp. 587-591; Sep. 1941.
Das et al, Indexing Flower Patent Images Using Domain Knowledge, IEEE Intelligent Systems, vol. 14, No. 5; 1999, pp. 24-33.
"Exalead CloudView Semantics Whitepaper," Doc. No. EN.140. 001.0-V1.2; Oct. 2010, pp. 1-30. Retrieved from http:www.3ds. com/fileadmin/PRODUCTS/EXALEAD/Documents/whitepapers/Exalead-CloudView-Semantics-EN.pdf on Aug. 24, 2015.
Bell, E., Color Detection: Technology on Heels With Lyst Engineering, dated Feb. 22, 2014, retrieved Apr. 7, 2014, <http://developers.lyst.com/data/images/2014/02/22/color-detection/>.
Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.
Csurka, Gabriela, et al.; "Learning moods and emotions from color combinations," Proceedings of the Seventh Indian Conference on Computer Vision, Graphics and Image Processing, pp. 298-305; New York; Dec. 12, 2010.
Das et al., "Indexing flowers by color names using domain knowledge-driven segmentation," Proc. The Fourth IEEE Workshop on Applications of Computer Vision; pp. 94-99; 1998.
Dorner, C.S., Image-Based Color Palette Generation, U.S. Appl. No. 14/316,483, filed Jun. 26, 2014.
Dorner, C.S., Automatic Image-Based Recommendations Using a Color Palette, U.S. Appl. No. 14/316,268, filed Jun. 26, 2014.
Global Color Survey, http://www.colorcom.com/global-color-survey, Feb. 1, 2001, accessed Sep. 11, 2015.
Heer, Jeffrey, et al.; "Color naming models for color selection, image editing and palette design," Proceedings of the 2012 ACM Annual Conference on Human Factors in Computing Systems, pp. 1007-1016; New York; May 5, 2012.
Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.
Luo, J., et al., "Novel Color Palettization Scheme for Preserving Important Colors," Proceedings SPIE 5008. Color Imaging VIII: Processing, Hardcopy, and Applications; Jan. 20, 2003.
Montagne, C., et al., "Adaptive Color Quantization Using the Baker's Transformation," J. Electronic Imaging 15(2), Apr.-Jun. 2006, 21 pages.
Periasamy, P.S., et al., "A Common Palette Creation Algorithm for Multiple Images with Transparency Information," Proceedings of the International Conference on Advances in Computing, Control, and Telecommunication Technologies, IEEE 2009.
Tremeau et al., "A vector quantization algorithm based on the nearest neighbor of the furthest color," Proceedings of International Conference on Image Processing, vol. 3, pp. 682-685, Oct. 26-29, 1997.
Tropf, H. et al., "Multidimensional range search in dynamically balanced trees," Angewandte Informatik (Applied Informatics), pp. 71-77; Braunschweig, Germany; Feb. 1, 1981.
Wang et al., "Contextual Dominant Color Name Extraction for Web Image Search," 2012 IEEE International Conference on Multimedia and Expo Workshops (ICMEW), pp. 319-324.
Yu, M.P., et al., "Contextual Algorithm for Color Quantization," J. Electronic Imaging 12(3):442-447, Jul. 2003.
Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.
International Search Report and Written Opinion in PCT/US2015/037469 mailed on Oct. 1, 2015.
International Search Report and Written Opinion in PCT/US2015/037456 mailed on Sep. 9, 2015.
International Search Report and Written Opinion in PCT/US2015/037494 mailed on Sep. 14, 2015.
International Search Report and Written Opinion in PCT/US2015/037465 mailed on Oct. 27, 2015.
International Search Report and Written Opinion in PCT/US2015/037481 mailed on Sep. 14, 2015.
Manjunath, B.S.; Color and Texture Descriptors; 2001; IEEE; vol. 11 No. 6; pp. 703-714.
Office Action in European Application No. 15734006.8, dated Dec. 21, 2017.
Wang, Yi-Fan, et al. A personalized recommender system for the cosmetic business, Expert Systems with Applications 26 (2004); pp. 427-434.

\* cited by examiner

BUILDING A PALETTE OF COLORS BASED ON HUMAN COLOR PREFERENCES

BACKGROUND

Items that create a visual impression generally utilize color, at least in part, to generate the visual impression. A palette of colors can be used, e.g., with clothes, artwork, images, video, and other visual media to provide a certain or desired look and feel. The particular colors that make up an individual color palette can be selected based on a variety of criteria such that the resulting palette generates the overall desired visual impression.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
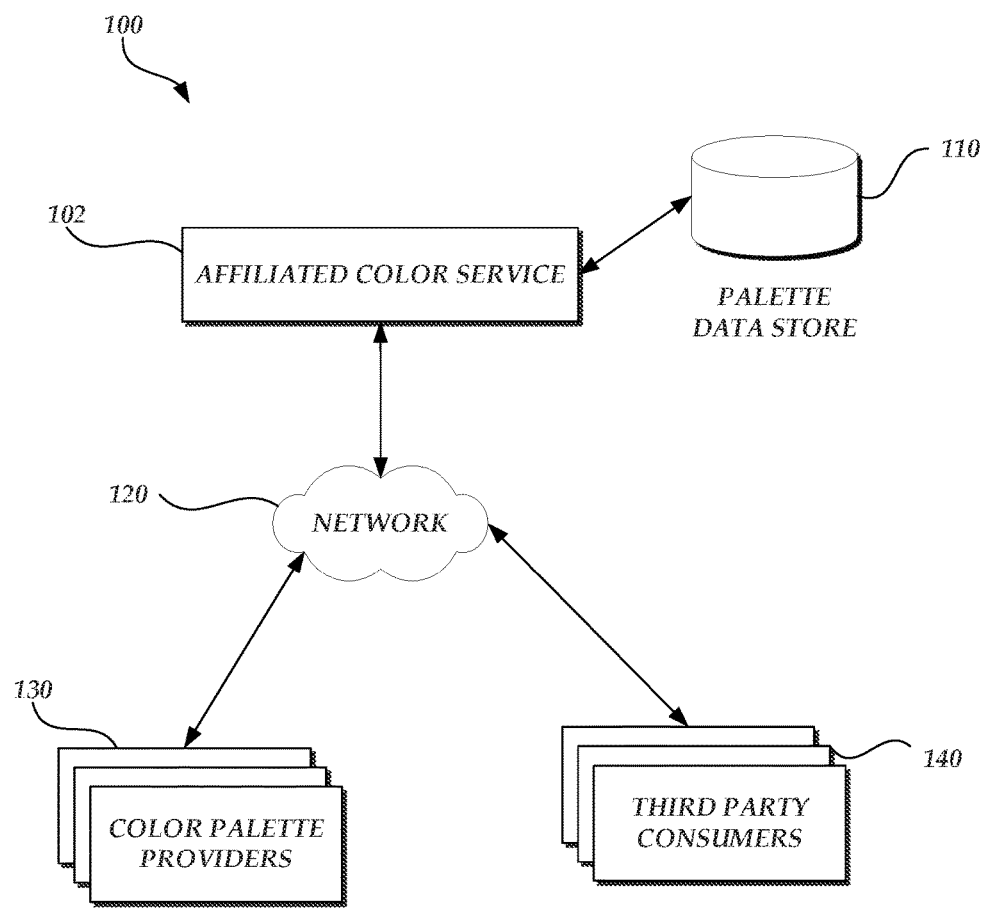
FIG. 1 illustrates a block diagram of an example operating environment that includes an affiliated color service to generate a color palette based at least in part on an input color or colors.

Generally described, aspects of the present disclosure relate to building a palette of colors using color palettes that have been ranked or voted on by people to indicate which combinations of colors are more preferable, visually appealing, popular, or the like. The present disclosure includes systems and methods configured to identify colors affiliated with an initial color or colors based at least in part on human color preferences. A color palette can be built using identified affiliated colors.

Palettes of colors can be used to design visual articles, such as artwork or clothes, so that the article is visually appealing. This can increase the desirability of the article. In addition, palettes of colors can be used to evoke targeted reactions or emotions which are associated with a look and feel of a visual presentation or article. For example, the colors of clothes can be selected to reflect trends in colors or to reflect a more classic or timeless look.

Systems may be designed to automatically generate color combinations based on one or more input colors. These systems may use algorithms to determine complementary colors, similar colors, colors arranged in a color space to cover predetermined color distances, and the like to generate a palette of colors.

However, mathematical algorithms may not account for trends in taste and human color preferences. Individuals can also create color palettes. The resulting color palettes may be different than the formulaic or predictable palettes that are generated automatically, yet visually appealing at least to the individual that created it. These color palettes may be ones that would generally not be created by a mathematical algorithm (e.g., a color palette that includes seemingly clashing colors).

Individuals, however, may be unable to account for trends in color combinations, identify or recreate popular color combinations, or the like, making it difficult to generate a color palette meeting their needs. In addition, it may be costly (e.g., time intensive) to create color palettes without the assistance of other people or systems.

Accordingly, the present disclosure provides systems and methods which generate color combinations that have been determined to be visually appealing or preferable by a community of people.

Aspects of the present disclosure leverage one or more data stores of color palettes that have been rated, ranked, and/or voted on by a community of people to indicate which color combinations are preferred by that community. Using an initial color or colors, an ordered list of affiliated colors can be generated where each affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette.

In some embodiments, a first color can be selected by a program implemented by a computing device, or a user; and a plurality of palettes can be identified from a data store of palettes that contain the first color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be ordered based on the assigned weights. The program or user can select an affiliated color from the ordered or weighted list to add to a custom color palette containing the initial color. When the selected affiliated color is added to the palette, a new list of affiliated colors can be generated based at least in part on the colors in the palette. This allows the program or user to continue to build the color palette.

In some embodiments, two or more colors can be selected by a program or a user and a plurality of palettes can be identified from a data store of palettes that contain one or more of those colors (or sufficiently similar colors). A list of affiliated colors can be generated that includes a weight factor for each color, the weight factor based on the ranking, rating, and/or number of votes the containing palette has received. In certain implementations, the weight factor can be adjusted based on the relative popularity, rating, and/or ranking of the initial two or more colors. This may be accomplished, for example and without limitation, by decreasing the weight of colors affiliated with a relatively popular color and/or increasing the weight of colors affiliated with a relatively unpopular color or vice versa. From the weighted list of affiliated colors, the program (as implemented by a computing device) or user can select a color to add to the palette containing the initial two or more colors. When the selected affiliated color is added to the palette, a new list of affiliated colors can be generated based at least in part on the two or more initial colors, along with the new color added to the palette that allows the program or user to continue to build the color palette.

Overview of an Example Embodiment of an Affiliated Color Service

Turning now to FIG. 1, the figure illustrates a block diagram of an example operating environment 100 that includes an affiliated color service 102 to generate a color palette based at least in part on an input color or colors. In some embodiments, the operating environment 100 includes the affiliated color service 102, a palette data store 110, a network 120, color palette providers 130, and third party consumers 140. In some embodiments, various components of the operating environment 100 are communicatively interconnected with one another via the network 120. The operating environment 100 may include different components, additional components, fewer components, or can be structured differently. For example, there can be more than one data stores or other computing devices in connection with the affiliated color service 102. As another example, components of the operating environment 100 may communicate with one another with or without the network 120.

The affiliated color service 102 can correspond to any system capable of performing the processes described herein. The affiliated color service 102 may be implemented by one or more computing devices. For example, the affiliated color service 102 may be implemented by computing devices that include one or more processors to execute one or more instructions stored in memory, and communication devices to transmit and receive data over the network 120. In some embodiments, the affiliated color service 102 is implemented on one or more backend servers capable of communicating over a network. In certain embodiments, the affiliated color service 102 is implemented by one or more virtual machines in a hosted computing environment. The hosted computing environment may include one or more provisioned and released computing resources, which computing resources may include computing, networking or storage devices.

In some aspects, the affiliated color service 102 can implement one or more applications that perform, individually or in combination, functions described herein, including determining affiliated colors, assigning weights to affiliated colors, normalizing weights of affiliated colors, clustering or combining colors based on color distances, determining color similarity thresholds, updating affiliated colors based at least in part on updated palettes, etc. In certain aspects, the affiliated color service 102 may be configured to store or update palettes at the palette data store 110. In some embodiments, the affiliated color service 102 is associated with a network or network-based merchandise provider or vendor.

In the illustrated embodiment, the affiliated color service 102 is communicatively connected to the palette data store 110. The palette data store 110 can generally include any repository, data store, or information storage system that can store palette data and associated metadata. The palette data stored in the palette data store 110 can include collections of colors generated by a user and/or system based at least in part on human color preferences. Palette data can be stored in various formats, such as lists, groups, vectors, arrays, matrices, etc. Metadata can be associated with individual palettes and/or colors, for purposes of indicating their name, format, semantics, features, conditions, or the like.

The network 120 may include any suitable combination of networking hardware and protocols necessary to establish communications within the operating environment 100. For example, the network 120 may include private networks such as local area networks (LANs) or wide area networks (WANs) as well as public or private wired or wireless networks, satellite networks, cable networks, cellular networks, the Internet, or any combination thereof. In such embodiments, the network 120 may include hardware (e.g., modems, routers, switches, load balancers, proxy servers, etc.) implemented by hardware, and/or software (e.g., protocol stacks, accounting software, firewall/security software, etc.) implemented by hardware that establish networking links within the operating environment 100. Additionally, the network 120 may implement one of various communication protocols for transmitting data between components of the operating environment 100.

The color palette providers 130 may correspond to hosts of data stores of color palettes, the color palettes being ranked, rated, and/or voted on by a community of people associated with the color palette providers 130. The various hosts can include, for example and without limitation, hosts of an artistic network site, commerce network site, merchandise providers or vendors, designers, photographers, artists, social network sites, or the like. In some embodiments, the various color palette providers 130 are associated with a particular community of people such as artists, designers, photographers, cinematographers, fashion experts, critics, or the like. In certain embodiments, the color palette providers 130 are accessible by the public in general such that the associated color palettes are ranked, rated, or voted on by people that do not necessarily belong to any particular community or group. Examples of color palette providers 130 include Adobe Systems Incorporated's KULER® color services, Creative Market Lab, Inc.'s COLOURLOVERS™ color services, and the like.

The color palette providers 130 can create and/or curate color combinations based on the preferences of each provider's community of users. Particular color palette providers 130 may be associated with a particular community that includes a biased population or a population with unique or particular preferences. This may allow for the affiliated color service 102 to retrieve palettes with a known and/or desired bias depending at least in part on the use of the retrieved palettes. This may also allow for the affiliated color service 102 to reduce or remove the bias present in different communities by combining palettes from a plurality of communities of users.

The color palette providers 130 can be associated with any computing device(s) that can facilitate communication with the affiliated color service 102 via the network 120. Such computing devices can generally include network servers, desktops, laptops, wireless mobile devices (e.g., smart phones, PDAs, tablets, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

Similarly, third party consumers 140 may correspond to visitors to a commerce network site, designers, architects, or the like, and can be associated with any computing device(s) that can facilitate communication with the image processing service 102 via the network 120. Such computing devices can generally include wireless mobile devices (e.g., smart phones, PDAs, tablets, or the like), servers, desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above. The third party consumers 140 can include people utilizing the affiliated color service 102 to generate color palettes.

One skilled in the relevant art will appreciate that the components and configurations provided in FIG. 1 are illustrative in nature. Accordingly, additional or alternative components and/or configurations, including the additional components, systems and subsystems for facilitating functions disclosed herein may be utilized.

Figure 2:
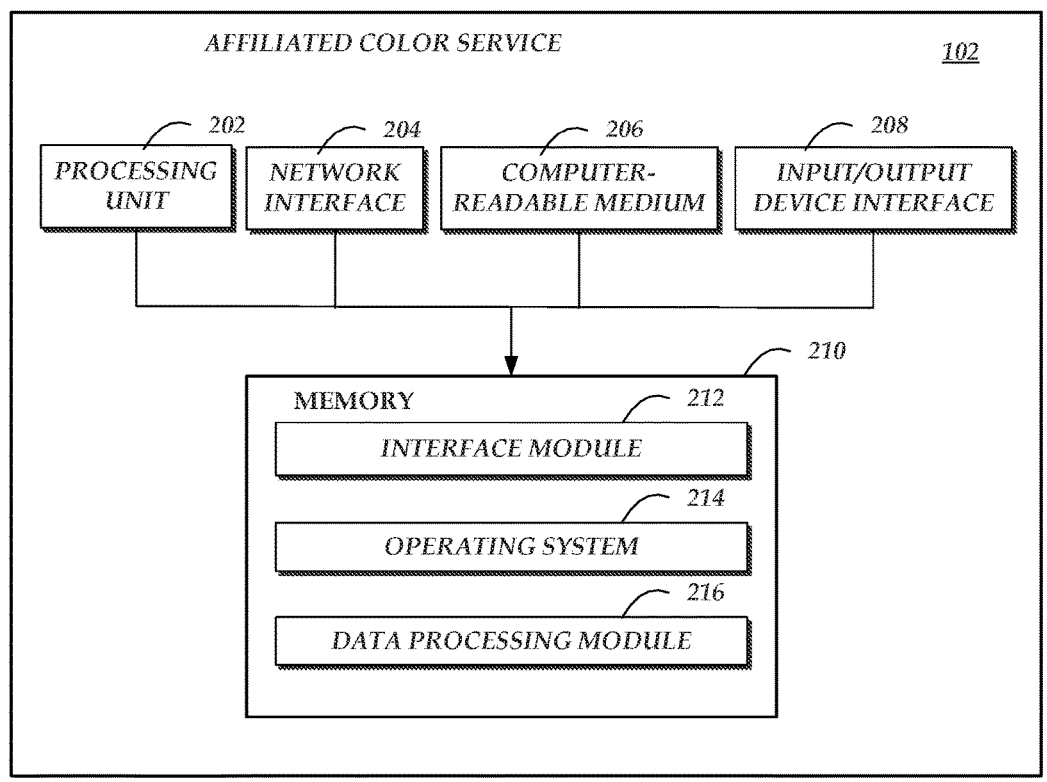
FIG. 2 illustrates a block diagram of example components of an affiliated color service utilized in accordance with the operating environment of FIG. 1.

FIG. 2 illustrates a block diagram of example components of an affiliated color service 102 utilized in accordance with the operating environment 100 of FIG. 1. The affiliated color service 102 includes an arrangement of computer hardware and/or software components that may be used to implement aspects of the present disclosure. Those skilled in the art will appreciate that the affiliated color service 102 may include different components (e.g., more or fewer components) than those depicted in FIG. 2. Those skilled in the art will also appreciate that not all of these generally conventional components have been shown but are understood to be present to enable the functionality and processes described herein.

In the illustrated embodiment, the affiliated color service 102 includes a processing unit 202, a network interface 204, a non-transitory computer-readable medium 206, and an input/output device interface 208, all of which may communicate with one another by way of a communication bus. The network interface 204 may provide the affiliated color service 102 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more processes described herein. The memory 210 generally includes RAM, ROM, and/or other persistent or non-transitory computer-readable storage media. The memory 210 may store an operating system 214 that provides computer program instructions for use by the processing unit 202 in the general administration and operation of the affiliated color service 102. The memory 210 may further include other information for implementing aspects of the present disclosure.

In some embodiments, the memory 210 includes an interface module 212. The interface module 212 can be configured to facilitate generating one or more user interfaces through which a third party consumer 140, utilizing a compatible computing device, may interact with the affiliated color service 102 to access affiliated colors, generate or modify a color palette, etc. Specifically, the interface module 212 can be configured to facilitate color palette generation functions described herein, including generating a list or grouping of affiliated colors, weighting affiliated colors, updating affiliated color lists upon updates to input color or colors, ranking and/or ordering the affiliated colors, combining colors based at least in part on color distance, etc. For example, a third party consumer 140 may provide an initial color or colors around which a color palette may be built. This can be done via one or more generated user interfaces. The user interface can be implemented as a graphical user interface (GUI), network-based user interface, computer program, smartphone or tablet program or application, touchscreen, command line interface, gesture, voice, or text interface, etc., or any combination thereof. Furthermore, the user interfaces can display an ordered and/or weighted list of affiliated colors, the current colors selected and/or included in the palette being generated, and the like.

In addition, the memory 210 may include a data processing module 216 that may be executed by the processing unit 202. In some embodiments, the data processing module 216 implements aspects of the present disclosure. For example, the data processing module 216 can be configured to process color data, instructions, or metadata. Specifically, the data processing module 216 can be configured to perform affiliated color functions described herein, including identifying affiliated colors, weighting affiliated colors, clustering or combining colors, etc. The color data processed by data processing module 216 can be of various formats. For example, color can be represented by a vector based on a primary color model (e.g., 0) or a luminance-chrominance model (e.g., Y'UV, YUV, YCbCr, or YPbPr).

It should be noted that the affiliated color service 102 may include some or all of the components present in the affiliated color service 102 as discussed herein with respect to FIG. 2. In addition, the affiliated color service 102 may include additional components not present in FIG. 2. The modules or components described above may also include additional modules or be implemented by computing devices that may not be depicted in FIG. 1. For example, although the interface module 212 and the data processing module 216 are identified in FIG. 2 as single modules, one skilled in the relevant art will appreciate that each of the modules may be implemented by two or more modules and in a distributed manner. As another example, the affiliated color service 102 and its components can be implemented by network servers, application servers, data store servers, combinations of the same, or the like, configured to facilitate data transmission to and from color palette providers 130 or third party consumers 140 via network 120. Accordingly, the depictions of the modules are illustrative in nature.

Example Process to Generate a List of Affiliated Colors

Figure 3:
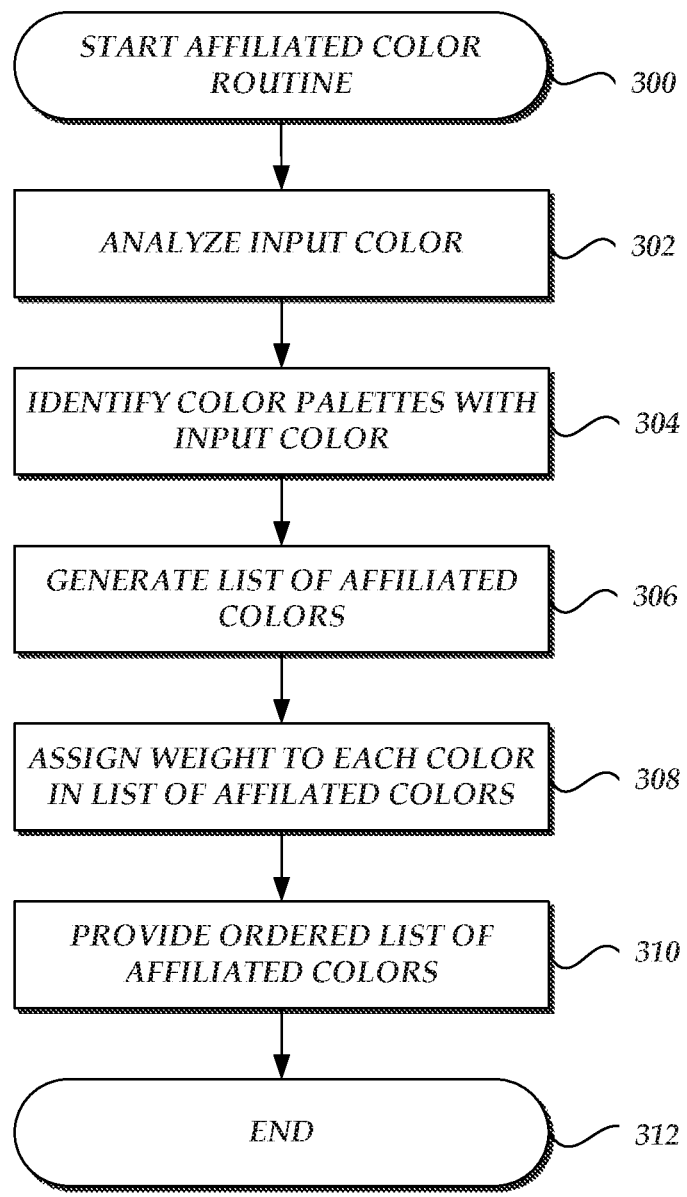
FIG. 3 illustrates a flow diagram of an example routine for generating an ordered list of affiliated colors, the routine implemented by an affiliated color service such as that shown in FIG. 1.

FIG. 3 illustrates a flow diagram of an example routine 300 for generating a weighted or ordered list or grouping of affiliated colors, the routine implemented by an affiliated color service 102. Routine 300 begins at block 302, where the affiliated color service 102 analyzes an input color. The input color can be received from a user (e.g., a third party consumer 140 via data transmission to the affiliated color service 102), from another system, or generated randomly. In some embodiments, the input color can be extracted from an image, such as an image provided by a user or an image of a product in a product catalog or on a network site. Various systems and methods for extracting colors from an image are described in U.S. patent application Ser. No. 14/316,483, entitled "IMAGE-BASED COLOR PALETTE GENERATION," filed Jun. 26, 2014, which is incorporated by reference herein in its entirety.

In some embodiments, the input color is determined based at least in part on preferences, behavior, or properties of a user. A system can analyze properties of the user and determine one or more colors that the user is likely to prefer. For example, the affiliated color service 102, or other system, may have access to a user profile, which includes, for example and without limitation, media preferences (e.g., preferred movies, TV shows, books, music, etc.), purchase history (e.g., products purchased in an electronic marketplace), demographics (e.g., age, gender, nationality, etc.), geographical location (e.g., where the user resides and/or previously resided), product preferences (e.g., through the use of wish lists), and the like. The affiliated color service 102 can analyze such information and determine probable colors that the user would like. One or more of these colors determined by the affiliated color service 102 can be used as the input color. As another example, the affiliated color service 102, or other system, can compare users to determine an input color. For a particular user, the affiliated color service 102 can analyze the color preferences of similar users (e.g., where similarity of users can be based at least in part on purchase history, media preferences, demographics, etc.) to determine one or more input colors that the particular user would prefer. This can be done by identifying another user with similar preferences and/or by aggregating user profile information to identify color preferences for an average user with similar preferences.

In block 302, analyzing the input color image can include determining the components of the color, such as the primary color values (e.g., RGB values), the luminance-chrominance values (e.g., YUV or YCbCr values), or the like. Analyzing the input color image can also include determining a threshold within which a color will be considered to be the same as, or sufficiently similar to, the input color. The threshold can be based on color distance according to a color distance formula. An example of such a formula is based on a human perceptible color difference. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014; each of which is incorporated by reference herein in its entirety.

At block 304, the affiliated color service 102 identifies a plurality of color palettes that include the input color. The color palettes can be provided by the color palette providers 130. In some embodiments, one or more color palettes can be provided by the palette data store 110 where the palettes stored therein have been voted on, ranked, and/or rated. In some embodiments, the plurality of color palettes can be provided by the third party consumers 140.

The affiliated color service 102 determines that a palette contains the input color when that palette has at least one color that falls within the threshold color distance from the input color, as determined at block 302. In this way, palettes including colors not identical to the input color, but that include colors sufficiently close to the input color, are included in the list of palettes identified at block 304. In some embodiments, the affiliated color service 102 can use a fast color indexing routine to pull colors from the palettes, as described in U.S. patent application Ser. No. 14/315,700, entitled "FAST COLOR SEARCHING," filed Jun. 26, 2014, which is incorporated by reference herein in its entirety.

At block 306, the affiliated color service 102 generates a list or grouping of affiliated colors. The list of affiliated colors comprises the colors from the list of palettes identified at block 304, excluding the input color and those colors that are sufficiently close to the input color. In some embodiments, the list of affiliated colors can include all the colors from the list of palettes. In certain embodiments, the list of affiliated colors is concatenated based at least in part on a threshold number of colors to include in the list, a desired or targeted color variety, color exclusion rules, or the like.

At block 308, the affiliated color service 102 assigns weights to each color in the list of affiliated colors. The affiliated color service 102 loops through each color in the list, identifies from which palette the color originated, and adjusts a weight of the color based at least in part on the ranking, rating, and/or number of votes associated with the originating palette. Adjusting the weight of the color can include increasing the weight factor by a number of votes or average rating of the originating palette. In some embodiments, adjusting the weight of the color includes scaling the ranking, rating, and/or number of votes based at least in part on a number of factors that can include which users voted on the palette, the age of the palette, the number of comments on the palette, the geographical location of the users who voted, and the like. In some embodiments, the ranking, rating, and/or voting of a palette is distributed among the colors within a particular palette based at least in part on color popularity, ranking of colors within a palette, or the like. In certain embodiments, each color in a palette has an individual ranking, rating, and/or number of votes where the rating can be associated with the rating of the palette or independent from the rating of the palette.

Where a color appears in more than one palette, the weight of that color can be determined at least in part by aggregating the weights from each originating palette. One aggregation method is to add the weights of each originating palette. As an example of a simple case, where a color appears in 3 palettes, the weight of that color can be equal to the sum of the votes of each of the 3 palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette, for example). Weight aggregation can also be configured to account for rating of a palette or color as a function of time and/or geographical location.

The affiliated color service 102 can use a similar color distance threshold when aggregating weights for an affiliated color. For example, a color distance threshold can be used such that when the affiliated color service 102 is determining a weight for an affiliated color, it aggregates the votes from the palettes containing that affiliated color and the palettes that contain a color with a distance from the affiliated color that is less than or equal to the color distance threshold. The color distance threshold used in analyzing the input color at block 302 and the color distance threshold used in weighting affiliated colors at block 308 can be the same or different, and may be based on the same or different color distance algorithms.

At block 310, the affiliated color service 102 tallies the weights of each color and provides a weighted, ordered, and/or ranked list or grouping of affiliated colors, where the rank of an affiliated color is based at least in part on the relative weight of the color. The affiliated color service 102 can concatenate the ordered list of affiliated colors based at least in part on a desired or targeted number of colors to include in the list, a threshold weight factor to include in the list, a variety of colors in the list, color exclusion rules, or the like. Routine 300 ends at block 312.

Figure 4:
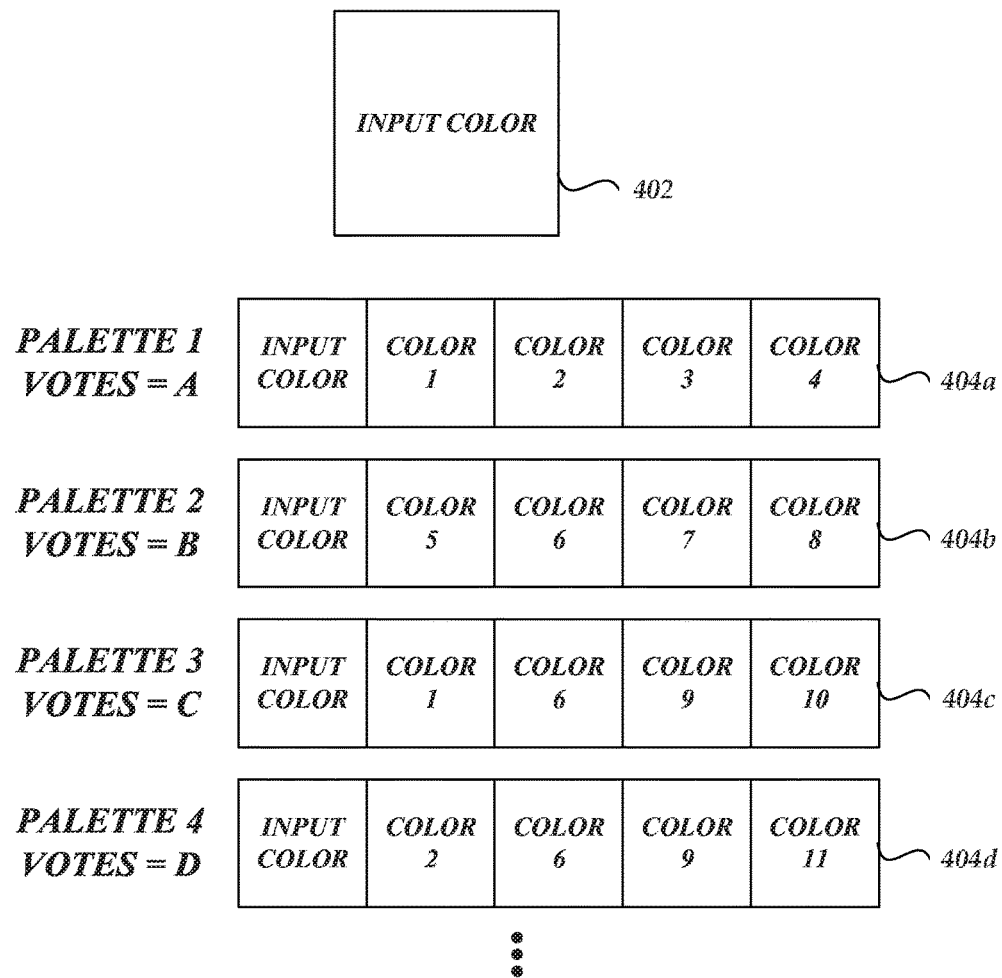
FIG. 4 illustrates an example ordered list of affiliated colors generated by the example routine of FIG. 3.

FIG. 4 illustrates an example list of affiliated colors 400 generated by the example routine 300 of FIG. 3. Starting with the input color 402, the affiliated color service 102 identifies a number of palettes 404*a*-404*d*, each of which includes the input color or a color sufficiently similar to the input color (e.g., where the color distance between the color in the palette and the input color is less than a color distance threshold). The palettes 404*a*-404*d* can be from a data store of human- or machine-created color palettes, but which have been voted on, ranked, or rated by a community of users. As used herein, the terms votes, rating, and/or ranking are used to indicate that there is a value associated with the palette where the value is indicative of a level of human preference for the palette. Where only a single term is used (e.g., only vote, ranking, or rating), it is to be understood that the other terms could also be used. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another.

Each time a palette is identified that contains the input color, or a color sufficiently close to the input color, each of the other colors in the palette is added to a list of affiliated colors. Each of the colors on the list of affiliated colors receives a weight that corresponds to the rating of the originating palette. For example, each of colors 1-4 in palette 1 404*a* is assigned a weight corresponding to the number of votes for palette 1 404*a*, represented by the variable A. Likewise, each of the colors in palettes 2-4 404*b*-404*d* is assigned a weight corresponding to the number of votes for each palette, represented by the variables B-D.

If a color is found in more than one palette, the weight of the color is adjusted based on the rating of each of the originating palettes. For example, color 1 is found in palette 1 and palette 3, so the weight of color 1 is based on the number of votes A+C. In some embodiments, an affiliated color is considered to be found on another palette (e.g., other than its originating palette) when the color in the other palette has a color distance that is less than a color distance threshold from the affiliated color. In some embodiments, the weighting of colors is analyzed as a function of position in a color space where the distribution of weighted colors is analyzed to determine maximums. This may provide additional details about which colors are generally considered to go well with the input color, which may in turn result in the ability to provide multiple suggestions of colors within and/or around a peak color in the color space.

In some embodiments, the list of affiliated colors is adjusted to combine colors that are close to one another based at least in part on a color distance formula. This aspect can be used to decrease the number of different colors where some colors are sufficiently similar to one another, thus reducing the number of variations of a color, especially where the variations are insignificant, imperceptible, or otherwise lacking in value to a user.

Once the weight of each affiliated color is determined, a weighted or ordered list of affiliated colors 406 can be provided. The ordered list can include all the different colors from the palettes 404*a*-404*d* or it can contain a subset of these colors. The ordering of the list can be based at least in part on the weight of each color (e.g., higher weighted colors are ranked higher). As illustrated in the figure, the colors 1-11 are ranked according to the sum of the votes for each color, where A is greater than B, which is greater than C, which is greater than D. Accordingly, using an aggregation scheme based on the sum of weights, color 6 has a weight of B+C+D, color 1 has a weight of A+C, color 2 has a weight of A+D, etc.

In some embodiments, the ratings of the palettes are time-dependent. The affiliated color service 102 can use the time-dependent ratings to identify trends in color combinations and/or to identify color combinations that are relatively stable over time (e.g., classic color combinations). This can also be used to determine color combinations that were popular at a particular time.

Time-dependent ratings can also be used to predict color trends in the future. For example, the most popular colors can be tracked as a function of time, with the result plotted in a color space. The path through the color space of the most popular color (e.g., the color that is the most popular color at a point in time) can be used to project what the most popular color will be at some point in the future. For example, the affiliated color service 102 can determine a directional shift of the most popular color within the color space as a function of time and project based on the directional shift. The affiliated color service 102 can then provide suggestions of color combinations based on projections of which colors will be popular at a point in time. This may be useful, for example, for visual artists to predict trends in colors and/or color combinations. It is to be understood that this projection technique can be used for the most popular color as well as the second most popular, third most popular, etc. It is also to be understood that this projection technique can be used for color palettes as well as individual colors.

In some embodiments, geographical information can be included with the ratings of the palettes (e.g., ratings of a palette can be provided as a function of location of the voting user). The affiliated color service 102 can use the geography-associated ratings to identify color combinations that are generally associated with a geographical location. For example, users within a geographical region may prefer a color combination associated with a sports team from the geographical region. The affiliated color service 102 can use information about the user (e.g., where the user is located) to suggest color combinations that utilize the geography-associated ratings of palettes.

Example Affiliated Color Palette Generation Process

Figure 5:
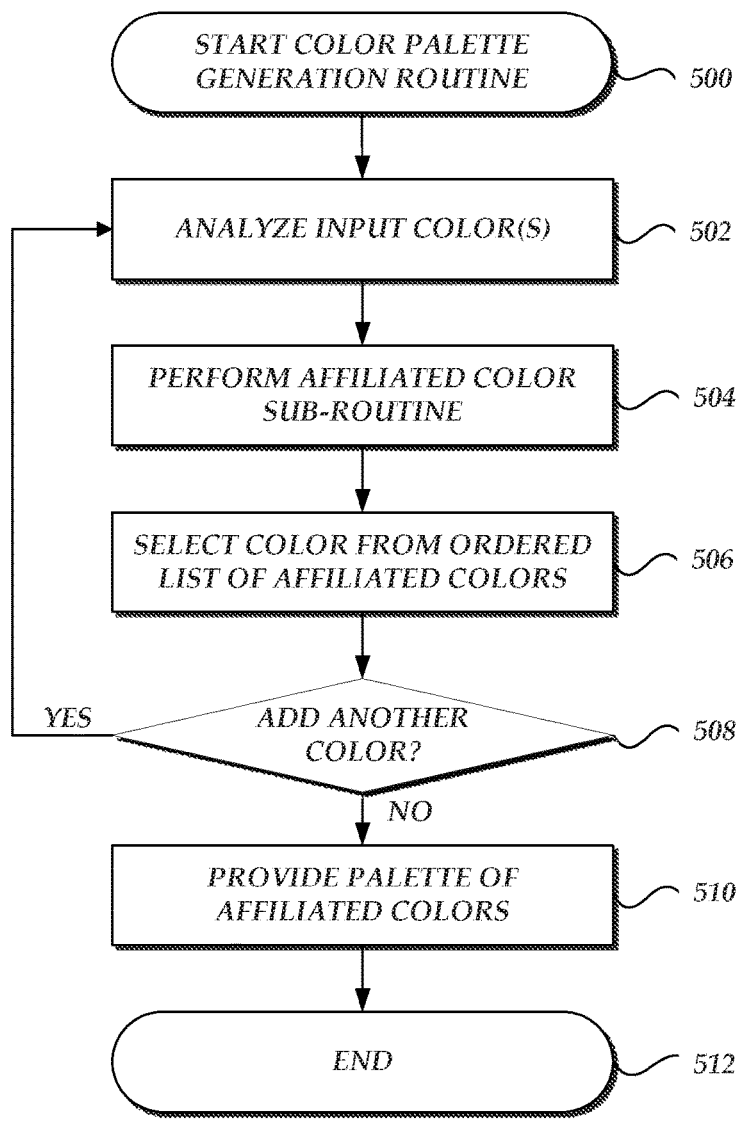
FIG. 5 illustrates a flow diagram of an example affiliated color palette generation routine implemented by an affiliated color service such as that shown in FIG. 1.

FIG. 5 illustrates a flow diagram of an example affiliated color palette generation routine 500 implemented by an affiliated color service 102. Routine 500 begins at block 502, where the affiliated color service 102 analyzes an input color or colors. The input color or colors can be received as described above with respect to block 302 of routine 300, illustrated in FIG. 3. Analysis of the input color or colors can include the functions described herein with reference to block 302 in FIG. 3. Returning to FIG. 5, in some embodiments, the routine 500 can accept a plurality of input colors in determining a color palette, a particular example of which is described with reference to FIGS. 9 and 10. In such a case, analyzing the input colors can include repeating, for each input color, the element of analyzing the input color as described with reference to block 302 in FIG. 3.

With reference to FIG. 5, at block 504, the affiliated color service 102 performs routine 300, described herein with reference to FIG. 3. In some embodiments, the affiliated color service can move to block 304 upon entering the routine 300 because the input color or colors has been analyzed in block 502. As described, the output of routine 300 is a weighted or ordered list or grouping of affiliated colors. The routine 300 can be modified to provide the ordered list of affiliated colors where there is a plurality of input colors. For example, the affiliated color service 102 can identify palettes that include one or more of the plurality of affiliated colors. In some embodiments, the affiliated color service 102 identifies palettes which include all of the input colors. In some embodiments, the affiliated color service 102 identifies palettes that include at least one of the input colors. Once the palettes are identified, the weighting of the list of affiliated colors can proceed much the same way as described herein. In some embodiments, the weighting scheme of the affiliated colors is modified based on the input colors. For example, the popularity of each of the input colors can be used to normalize or scale the weighting factors of palettes of the respective input colors.

At block 506, the affiliated color service 102 selects a color from the ordered list of affiliated colors. The selection can be based on user input through a user interface. For example, routine 500 can be interactive such that a user provides the affiliated service 102 with the input color(s) and is provided the ordered list of affiliated colors generated at block 504. The user can then select a color from the ordered list and indicate the selection to the affiliated color service 102. In some embodiments, the affiliated color service 102 selects a color from the ordered list of affiliated colors. The selection can be based at least in part on any one or more of the weighting of the affiliated color, the color distance of the affiliated color from the input color and/or other affiliated colors on the list, a selection criteria determined by a user or other system, or the like. Selection of the color from the ordered list of affiliated colors adds that color to the palette which includes the input color(s). In some embodiments, a plurality of colors can be selected.

In some embodiments, the affiliated color service 102 can select two or more colors from the ordered list of affiliated colors and provide a projection of what palettes would look like based on the selected colors. For example, the affiliated color service 102 can select the two most popular colors from the ordered list of affiliated colors (e.g., the two colors with the highest weight) and create a first tentative color palette that contains the input color(s) and the first popular color, and a second tentative color palette with the input color(s) and the second popular color. The affiliated color service 102 can then provide a weighted or ordered list of affiliated colors for each of the two tentative color palettes. This can be accomplished, for example, through the routine 300 described herein with reference to FIG. 3. In addition, this can advantageously be used to show a direction a color palette may go based on selection of a particular color for a color palette. In certain embodiments, the affiliated color service 102 can select the two or more colors based on user input, input from another system, random selection, or any combination thereof.

In various embodiments, the affiliated color service 102 can recursively provide tentative color palettes to provide a variety of tentative color palettes. For example, for the two tentative color palettes described above, the affiliated color service 102 can select the two most popular colors from the ordered list of affiliated colors associated with each tentative color palette to generate a second level of tentative color palettes. This process can continue a number of times to provide the variety of tentative palettes. The affiliated color service 102 can select a different number of colors in each iteration of this routine and for each tentative palette. The affiliated color service 102 can select the two or more colors based on criteria which include, for example and without limitation, color popularity, color variety, exclusion rules, color distance, or any combination thereof.

At block 508, the affiliated color service 102 determines whether another color will be added to the palette. If another color is to be added, routine 500 returns to block 502 to analyze the input colors, which now includes the color selected in block 506.

If the palette is finished (e.g., no other colors are to be added to the palette), routine 500 proceeds to block 510 where the affiliated color service 102 provides the palette of affiliated colors. As illustrated in FIG. 1, the provided palette of affiliated colors can be stored in palette data store 110, sent to the third party consumers 140, and/or sent to the color palette providers 130. Routine 500 then ends at block 512.

Figure 6:
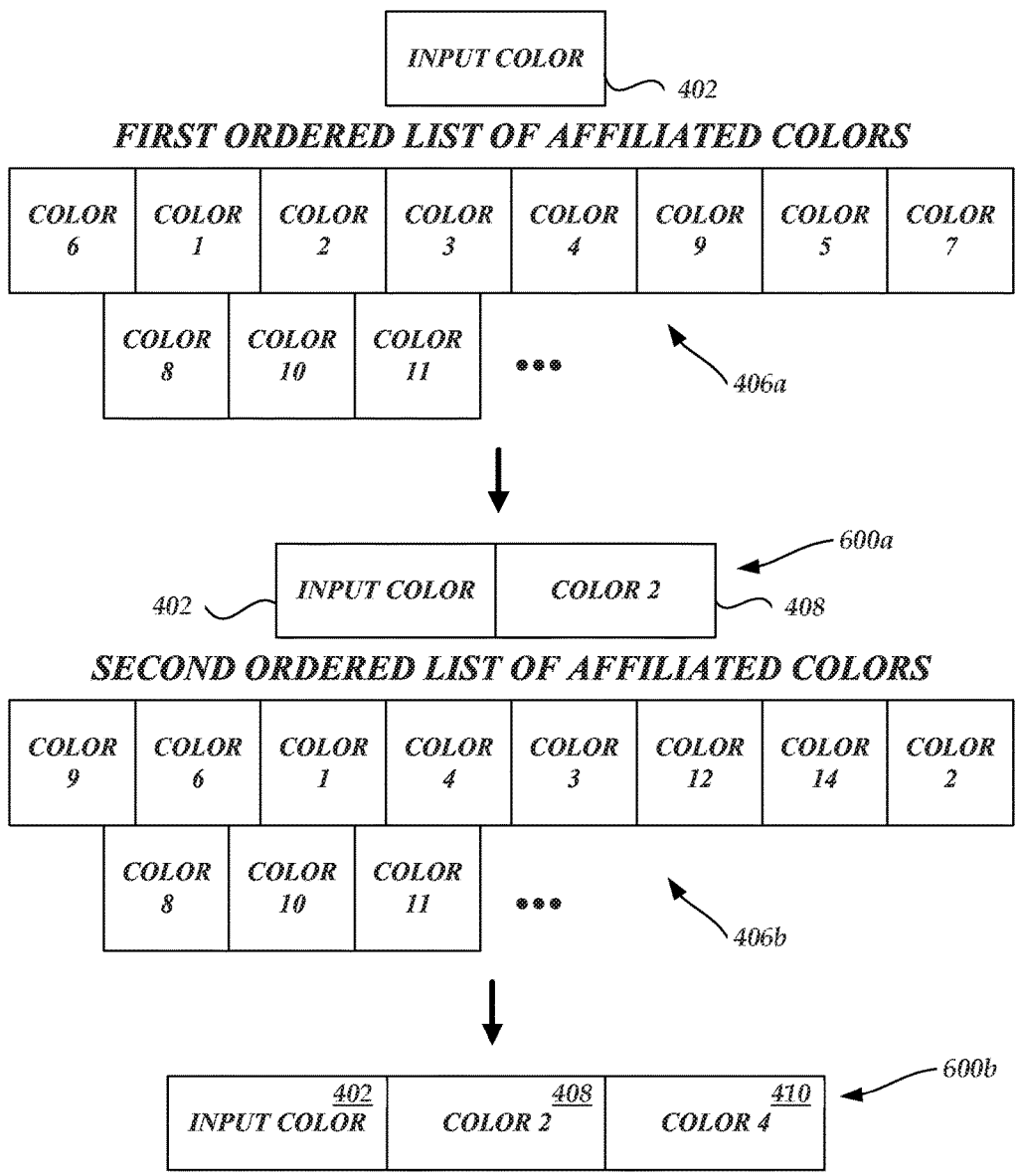
FIG. 6 illustrates example affiliated color palettes generated by the routine of FIG. 5.

FIG. 6 illustrates example affiliated color palettes 600a and 600b generated by the routine 500 of FIG. 5. Starting with an input color 402, a first ordered list of affiliated colors 406a is generated, as described with reference to FIG. 4. A color can be selected from the first ordered list of affiliated colors 406a. This results in a color palette 600a that includes the input color 402 and the selected color 408 (e.g., color 2 from the first ordered list of affiliated colors). The new color palette 600a can then be used to generate a second ordered list of affiliated colors that now includes colors associated with the input color 402 and the selected color 408. Because new and/or different palettes have been included in the routine to determine the ordered list of affiliated colors, the order of the affiliated colors may change. In addition, the second affiliated color list 406b may include colors not present in the first ordered list of affiliated colors 406a. This process can be repeated to build up a color palette with a plurality of colors, such as color palette 600b.

In some embodiments, as the number of input colors increases, the number of affiliated colors decreases. The affiliated color service 102, for example, may limit the identified palettes to those which include all of the input colors or a majority of the input colors. This may desirable to reduce the number of potential colors in the affiliated color list that may result in visually unappealing color combinations. In this way, the palette generation is self-limiting as the more colors in the palette, the fewer affiliated colors that are presented.

By using the votes of a community of users, the generated color palettes represent a subjective color combination that may be different from what a mathematical formula may provide and which is generally preferable to users. Using human arbiters to generate color combinations can provide color palettes that mathematical algorithms may be incapable of fully determining.

The input color or colors can be determined or provided by a user, a computer system, or a combination of both. For example, a user may want to build an outfit that includes the color pink. Based on this input color, the affiliated color service 102 can provide an ordered list of affiliated colors which have been determined by a community of users to go well with the input color. As another example, a user can select the color pink as an input color and the affiliated color service 102 can be configured to select a one or more additional colors randomly or through another algorithm to provide a suggested color palette (or multiple color palettes). As another example, the user can pick a product (or a collection of products) and a color fingerprint (or a subset of it) can be used as the basis for determining affiliated colors. Various methods and systems for extracting a color fingerprint from an image of a product are described in U.S. patent application Ser. No. 14/316,483, entitled "IMAGE-BASED COLOR PALETTE GENERATION," filed Jun. 26, 2014, which is incorporated herein by reference in its entirety. Any of these color palettes could then be used to identify and/or filter potential products for the user.

Figure 7:
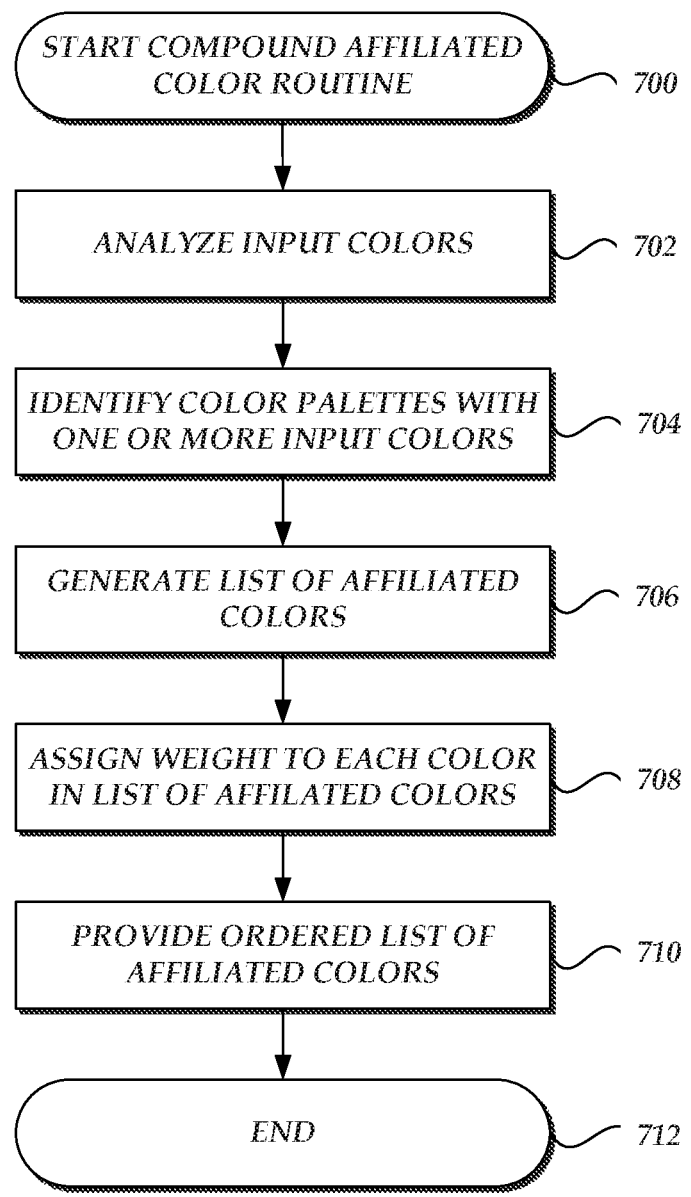
FIG. 7 illustrates a flow diagram of an example routine for generating an ordered list of affiliated colors from a plurality of initial colors, the routine implemented by an affiliated color service such as that shown in FIG. 1.

Example Process of Generating an Affiliated Color Palette Using Two or More Input Colors FIG. 7 illustrates a flow diagram of an example routine 700 for generating a list or grouping of affiliated colors from a plurality of initial colors, the routine implemented by an affiliated color service 102. Routine 700 begins at block 702, where the affiliated color service 102 analyzes two or more input colors. Similar to the routine 300 described with reference to FIG. 3, the input colors can be received from a user (e.g., a third party consumer 140 via data transmission to the affiliated color service 102), from another system (e.g., through analysis of a user profile), generated randomly, extracted from an image (e.g., see U.S. patent application Ser. No. 14/316,483, entitled "IMAGE-BASED COLOR PALETTE GENERATION," filed Jun. 26, 2014, which is incorporated by reference herein in its entirety), or a combination of these. Analyzing the two or more input colors can include determining a threshold within which a color will be considered sufficiently similar to the input color. The threshold can be the same or different for each of the two or more input colors. The threshold can be based at least in part on color distance, for example and without limitation, using a human perceptible color distance as described in more detail in U.S. patent application Ser. No. 14/316,483, entitled "IMAGE-BASED COLOR PALETTE GENERATION," filed Jun. 26, 2014, which is incorporated by reference herein in its entirety.

With reference to FIG. 7, at block 704, the affiliated color service 102 identifies a plurality of color palettes that include at least one of the two or more input colors. The color palettes can be provided, for example and without limitation, by the color palette providers 130, the palette data store 110, and/or the third party consumers 140. The affiliated color service 102 determines that a palette contains at least one of the input colors when the palette has at least one color that falls within the threshold color distance from at least one of the input colors, as determined at block 702. In some embodiments, the affiliated color service 102 can use a fast color indexing routine to pull colors from the palettes, as described in U.S. patent application Ser. No. 14/315,700, entitled "FAST COLOR SEARCHING," filed Jun. 26, 2014, which is incorporated by reference herein in its entirety.

At block 706, the affiliated color service 102 generates a list or grouping of affiliated colors. The list of affiliated colors comprises the colors from the list of palettes identified at block 704, excluding the two or more input colors and those colors that are sufficiently close to the two or more input colors. The list of affiliated colors can include all the colors from the list of palettes, a threshold (e.g., minimum or maximum) number of colors, a desired or targeted variety of colors, or the like. In some embodiments, the list of affiliated colors can be restricted to the colors that, for example and without limitation, appear in palettes containing a plurality of the input colors, all of the input colors, a majority of the input colors, or the like. As described with reference to FIG. 5, the affiliated color service 102 can recursively provide tentative color palettes to provide a variety of tentative color palettes where there is a plurality of input colors.

With reference to FIG. 7, at block 708, the affiliated color service 102 assigns a weight to each color in the list of affiliated colors. The affiliated color service 102 loops through each color in the list, identifies from which palette the color originated, and adjusts the weight of the color based at least in part on the ranking, rating, and/or number of votes associated with the originating palette. The weight assigned to a color can be further normalized to account for relative popularities of the two or more input colors.

The normalization procedure can include scaling the weight factors based on a percentage of total votes of all the palettes that contain a particular input color. For example, a normalization factor, N, can be defined to be a sum of all the weights, w, assigned to each palette:

$$N = \Sigma_{i=1}^{n} w_i$$

where the total number of terms in the sum, n, and the weight factor, $w_i$, can respectively be the total number of palettes and the weight factor of a particular palette, or the total number of colors and the weight factor of a particular color. The normalized weight factor for a particular color can then be $w_i/N$.

As a particular example, if a first input color is included in 10 palettes, and the total number of votes received for the 10 palettes is 250 votes, each color from a particular palette is assigned a weight factor equal to the number of votes for that palette, which is then normalized by dividing by 250. If a first affiliated color is included in a palette with 25 votes, the normalized weight factor for that color would be 0.1.

As another example, the normalization procedure can include normalization based at least in part on trending information. For example, the weight factor of an affiliated color can be increased or decreased if the popularity of the affiliated color has changed over time. If an affiliated color has experienced a recent increase in popularity, the weight factor can be increased (e.g., where it is desirable to emphasize current trends) or decreased (e.g., where it is desirable to reduce the influence of temporary trends). The normalization procedure can account for trending across all the affiliated colors produced in block 706. The procedure can be configured to either increase or decrease the effects of recent shifts in popularity, depending at least in part on the desired outcome and/or the targeted use or application of the affiliated colors.

As another example, the normalization procedure can include geographical factors to adjust the weight of a color. For example, the weight factor of an affiliated color can be increased if that color is popular in the same geographical region as a user building a color palette.

As another example, the normalization procedure can include multiplying weight factors for each affiliated color. As a particular example, if a first affiliated color has a weight factor of w1 with respect to a first input color and a weight factor of w2 with respect to a second input color, the normalized weight factor is w1*w2. This can be used to eliminate affiliated colors that are affiliated with only one input color or with less than all input colors (e.g., the weight factor of an affiliated color will be 0 where it is not associated with a particular input color, and thus the normalized weight factor will be 0). This normalization procedure can be used to assign higher normalized weights to colors that have a high rating with respect to at least one input color. This normalization procedure can be used to assign higher normalized weights to colors that have average ratings with respect to a plurality of input colors.

Where a color appears in more than one palette, the weight of that color can be the combination of the weights. The affiliated color service 102 can aggregate the weights before and/or after normalizing them. As described with reference to FIG. 3, weight aggregation can be accomplished through a variety of techniques including, for example and without limitation, summing the weights, utilizing a weighted average technique, determining an arithmetic mean of weights, or the like. The affiliated color service 102 can use a color distance threshold when aggregating weights for an affiliated color, such as the technique described above with reference to block 702. The color distance threshold and/or algorithm can differ between the input colors and/or the affiliated colors.

With reference to FIG. 7, at block 710, the affiliated color service 102 tallies the normalized weights of each color and provides an ordered or ranked list or grouping of affiliated colors, where the rank of an affiliated color is based at least in part on the relative normalized weight of the color. The affiliated color service 102 can concatenate the ordered list of affiliated colors based at least in part on a desired or targeted number of affiliated colors to include in the list, a threshold weight factor to include in the list, a variety of affiliated colors in the list, or the like. Routine 700 ends at block 712.

Figure 8:
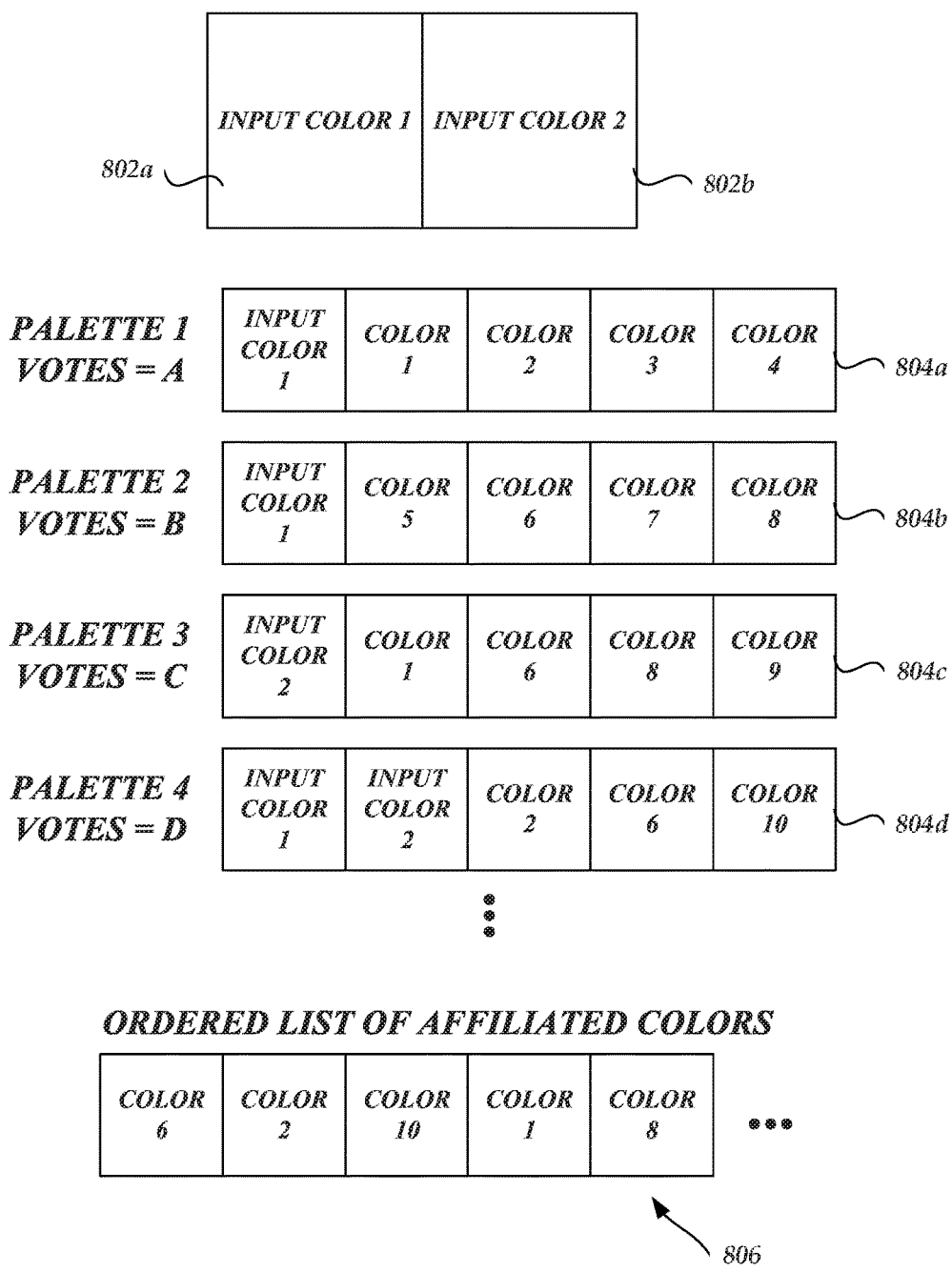
FIG. 8 illustrates an example ordered list of affiliated colors generated by the example routine of FIG. 7.

FIG. 8 illustrates an example list of affiliated colors 806 generated by the example routine 700 of FIG. 7. Starting with input color 1 802a and input color 2 802b, the affiliated color service 102 identifies a number of palettes 804a-804d, each of which includes at least one of the two input colors or a color sufficiently similar to at least one of the input colors (e.g., where the color distance between the color in the palette and at least one of the input color is less than a color distance threshold). The palettes 804a-804d can be from a data store of human- or machine-created color palettes that have been voted on, ranked, or rated by a community of users.

Each time a palette is identified that contains at least one of the input colors, or a color sufficiently close to at least one of the input colors, each of the other colors in the palette is added to a list of affiliated colors. Each of the colors on the list of affiliated colors receives a weight that corresponds to the rating of the originating palette. For example, each of colors 1-4 in palette 1 804a is assigned a weight corresponding to the number of votes for palette 1 804a, represented by the variable A. Likewise, each of the colors in palettes 2-4 804b-804d is assigned a weight corresponding to the number of votes for each palette, represented by the variables B-D.

In some embodiments, a list of affiliated colors is associated with an input color. For example, a first list of affiliated colors can be generated for input color 1 802a and a second list of affiliated colors can be generated for input color 2 802b, where the lists of affiliated colors are generated according to the methods described herein. In the example illustrated in FIG. 8, the list of affiliated colors for input color 1 802a includes colors 1-8 and 10; and the list of affiliated colors for input color 2 802b includes colors 1, 2, 6, and 8-10.

The weight of an affiliated color in a list of affiliated colors can be adjusted if the affiliated color is found in more than one palette. As described herein, the weight can be adjusted through various aggregation techniques. In determining whether an affiliated color appears in more than one palette, colors can be considered the same (or sufficiently the same) when the color in the other palette has a color distance that is less than a color distance threshold from the affiliated color. In some embodiments, colors that are sufficiently similar can be combined together in a list of affiliated colors and their weights can be combined as well.

To generate a single list of ordered affiliated colors, the weights of the colors from the various affiliated color lists can be normalized and combined. The normalization procedure can be any of those described herein, such as those described with reference to FIG. 7. The result can be an ordered list of affiliated colors, where the ordering of the colors on the list is according to the normalized weight factor.

In some embodiments, the normalization procedure can remove colors that appear in only one affiliated color list or in less than all affiliated color lists. One method of doing this is to multiply the weight factors across the affiliated color lists for each affiliated color. If the affiliated color does not appear in an affiliated color list, then the weight is assigned a value of 0 and the product of the weight factors is 0. Any affiliated color with a normalized weight factor of 0 can be removed from the ordered list of affiliated colors. In the example illustrated in FIG. 8, this procedure would remove colors 3-5, 7, and 9, leaving colors 1, 2, 6, 8, and 10.

As described herein, the affiliated color service 102 can use time-dependent ratings to provide projected affiliated color trends. As further described herein, the affiliated color service 102 can use geography-associated ratings to provide affiliated colors based at least in part on geographical information.

Figure 9:
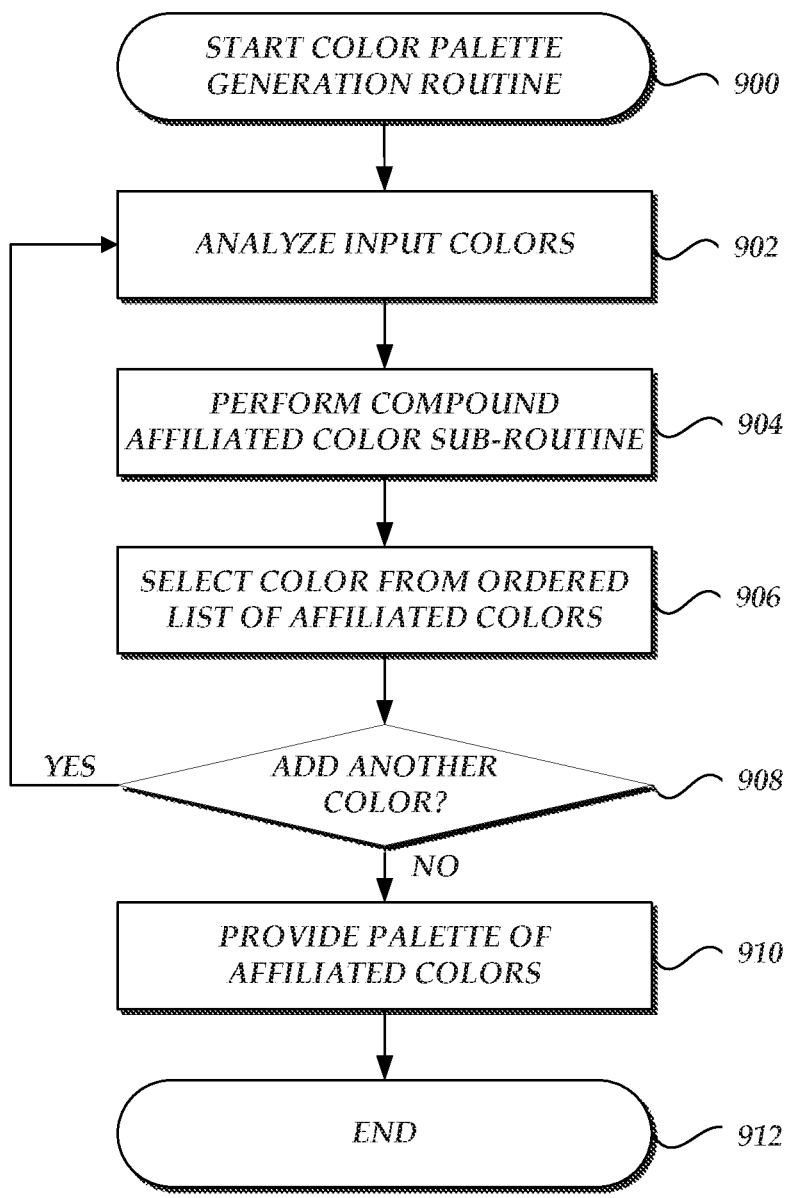
FIG. 9 illustrates a flow diagram of a routine for generating a color palette of affiliated colors from a plurality of initial colors, the routine implemented by an affiliated color service such as that shown in FIG. 1.

Example Affiliated Color Palette Generation Process Using Two or More Input Colors FIG. 9 illustrates a flow diagram of a routine 900 for generating a color palette of affiliated colors from a plurality of initial colors, the routine implemented by an affiliated color service 102. Routine 900 begins at block 902, where the affiliated color service 102 analyzes a plurality of input colors. Analysis of the input colors can include the functions described herein with reference to block 702 in FIG. 7. The input colors can be received as described above with respect to block 702 of routine 700, illustrated in FIG. 7.

At block 904, the affiliated color service 102 performs routine 700, described herein with reference to FIG. 7. In some embodiments, the affiliated color service can move to block 704 upon entering the routine 700 because the input colors have been analyzed in block 902. As described, the output of routine 700 is an ordered list or grouping of affiliated colors based on the plurality of input colors.

At block 906, the affiliated color service 102 selects a color from the ordered list of affiliated colors. The selection can be based on user input by a user via a user interface. For example, routine 900 can be interactive such that a user provides the affiliated service 102 with the input colors and is provided the ordered list of affiliated colors generated at block 904. The user can then select a color from the ordered list and indicate the selection to the affiliated color service 102. In some embodiments, the affiliated color service 102 selects a color from the ordered list of affiliated colors. The selection can be based at least in part on the weighting of the affiliated color, the color distance of the affiliated color from the input colors and/or other affiliated colors on the list, a selection criteria determined by a user or other system, or the like. Selection of the color from the ordered list of affiliated colors adds the color to the palette that includes the input colors. In some embodiments, a plurality of colors can be selected. As described herein, the affiliated color service 102 can recursively provide tentative color palettes to provide a variety of tentative color palettes.

At block 908, the affiliated color service 102 determines whether another color will be added to the palette. If another color is to be added, routine 900 returns to block 902 to analyze the input colors, which now includes the addition of an affiliated color selected in block 506. In some embodiments, the affiliated color that has been added to the palette can be treated differently from the initial input colors. For example, where the affiliated color service 102 restricts the ordered affiliated color list to colors that appear in the affiliated color list for each of the input colors, this same restriction can be removed for any additional affiliated colors added to the affiliated color palette.

If the palette is finished (e.g., no other colors are to be added to the palette), routine 900 proceeds to block 910 where the affiliated color service 102 provides the palette of affiliated colors. As illustrated in FIG. 1, the provided palette of affiliated colors can be stored in palette data store 110, sent to the third party consumers 140, and/or sent to the color palette providers 130. Routine 900 ends at block 912.

Figure 10:
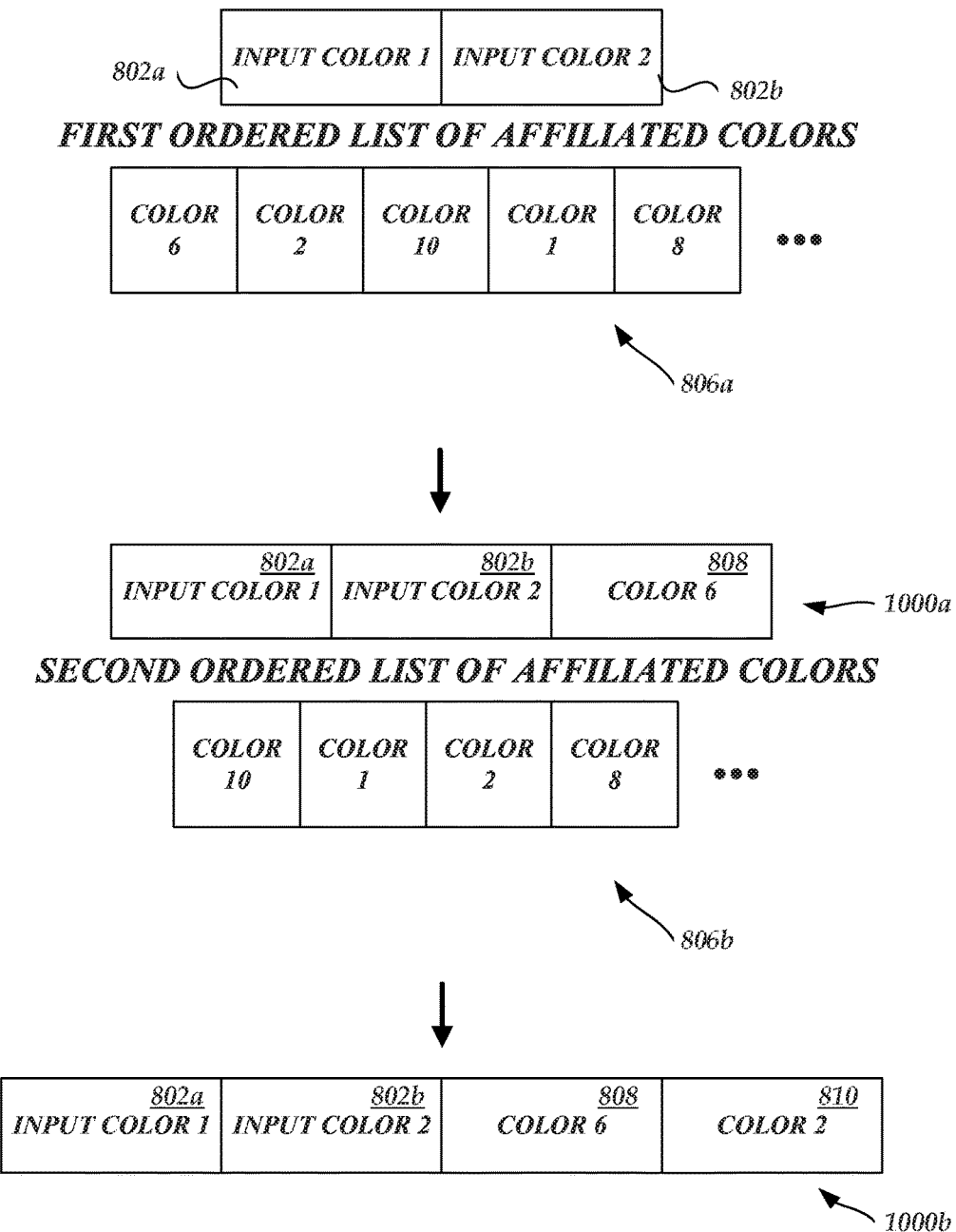
FIG. 10 illustrates example affiliated color palettes generated by the routine of FIG. 9.

FIG. 10 illustrates example affiliated color palettes 1000a, 1000b generated by the routine 900 of FIG. 9. Starting with input colors 802a and 802b, a first ordered list of affiliated colors 806a is generated, as described with reference to FIG. 8. A color can be selected from the first ordered list of affiliated colors 806a. This results in a color palette 1000a that includes the input colors 802a, 802b and the selected color 808 (e.g., color 6 from the first ordered list of affiliated colors). The new color palette 1000a can then be used to generate a second ordered list of affiliated colors that now includes colors associated with the input colors 802a, 802b and the selected color 808. Because new and/or different palettes have been included in the routine to determine the ordered list of affiliated colors, the order of the affiliated colors may change. This process can be repeated to build up a color palette with a plurality of colors, such as color palette 1000b.

In some embodiments, as the number of input colors increases, the number of affiliated colors decreases. The affiliated color service 102, for example, may limit the identified palettes to those that include all of the colors in the palette being built or a majority of the colors in the palette being built. This may desirable to reduce the number of potential colors in the ordered affiliated color list that may result in visually unappealing color combinations. In this way, the palette generation is self-limiting as the more colors in the palette the fewer affiliated colors that are presented.

The input colors 802a, 802b can be determined or provided by a user, a computer system, or a combination of both. For example, a user may want to build an outfit that includes the colors pink and blue. Based on these input colors, the affiliated color service 102 can provide an ordered list of affiliated colors that have been determined by a community of users to go well with both of the input colors. As another example, a user can select the colors pink and blue as input colors and the affiliated color service 102 can be configured to select a one or more additional colors randomly or through another algorithm to provide a suggested color palette (or multiple color palettes). Any of these color palettes could then be used to identify and/or filter potential products for the user.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Generally described, aspects of the present disclosure relate to creating a fast color search data store and/or performing a fast color search by one or more computing devices. Searching by color (e.g., a specific RGB color or a RGB color range) in a structured data store can be challenging due to the multidimensional nature of colors. Such a data store may include 3-dimensional RGB colors that are associated with objects in a relational database or some other type of data store. For example, the RGB color value (e.g., #c108e5) may be stored in the data store in association with a green dress, a green image, or any other data object with a green association.

The RGB color values in such a data store may be indexed for searching. A data store index may be a data structure that improves the speed of data retrieval operations on a data store table at the cost of additional writes and the use of more storage space to maintain the extra copy of data. Indexes are used to quickly locate data without having to search every row in a data store table every time a data store table is accessed. Indexes can be created using one or more columns of a data store table, providing the basis for both rapid random lookups and efficient access of ordered records. Such an index on a traditional integer field may allow for quick lookups within an integer range. For example, on an indexed integer field, a search of "between 2000 and 3000" may quickly return all records with integer fields between 2000 and 3000, and can be orders of magnitude faster than a comparison of integer values in all rows.

However, an index of an n-dimensional color value, such as an index of an RGB field, does not assist or speed up searching n-dimensional color ranges. In many scenarios, an RGB color value may be associated in a data store with object records in a data store. The RGB field may also be indexed. However, traditional data stores do not inherently index an RGB field correctly. For example, an RGB value (e.g., #c108e5 in hex) includes three dimensions: the red dimension ("c1"), the green dimension ("08"), and the blue dimension ("e5"). The bits in these separate hex values are arranged by dimension, but are not arranged in highest order to lowest order across all dimensions, which makes range comparisons difficult to perform with a single index. For example, the red dimension's bits in RGB come first, which includes both high order red bits through low order red bits. This is followed by green high order bits through low order bits, which is again followed by blue high order bits down to low order bits. Thus, if a color search range was specified as (#c001e0 through #cf10f0), a single traditional index cannot be used to quickly determine which of the records have associated colors within the range because such a lookup is dependent on an index data structure where all the bits in a field are ordered from highest to lowest order (e.g., usually an integer value or similar data type).

One way to solve this problem may be to have multiple index fields in a data store corresponding to each of the dimensional colors. For example, there may be one field for red (e.g., which may contain as a part of one record the value "c1"), another for green (e.g., which may contain as a part of one record the value "08"), and yet another for blue (e.g., which may contain as a part of one record the value "e5"). Each of these fields may be indexed individually. Thus, when ranges are searched, each index may be used for comparison to the indexed individual colors (e.g., for the range #c001e0 through #cf10f0, the range "c0" through "cf" may be applied to the red index, the range "01" through "0f" may be applied to the green index, and the range "e0" through "f0" may be applied to the blue index). The data store must then determine whether all three indexes indicated that a record was within the respective ranges.

The downside to the foregoing type of dimensional indexing is that a data store must search three indexes instead of one, and then make a comparison of whether all the criteria have been met for all indexes. This procedure is usually less efficient than using a single index to perform a search.

The embodiments described herein allow for increased query speed and fast searching, and overcome many of the drawbacks described above. More generally, in addition to color spaces, the techniques described herein may allow for fast searching of any multi-dimensional space, such as a traditional 3-dimensional coordinate space. For example, in a 3D video game, objects may be located in a 3-dimensional coordinate space on a map (e.g., an X horizontal dimension, a Y depth dimension, and a Z vertical dimension, where each dimension is orthogonal to the other dimensions). In such a video game, a fast searching technique that collapses a 3-dimensional coordinate search range into interleaved one-dimensional integer search ranges, as described herein, may be used to quickly find video game objects within the 3-dimensional coordinate search range.

In one embodiment in accordance with the present disclosure, an n-dimensional color space can be converted into a 1-dimensional color space. For the sake of brevity, although the embodiments described herein often refer to RGB color, which is a 3-dimensional color space, other dimensional color spaces (e.g., 4 or 5 dimensions, etc.) may use one or more of the same techniques described herein to gain the same advantages described for the RGB 3-dimensional color space. Thus, the same or similar techniques may be applied to the color spaces of XYZ, Hue Saturation Brightness/Luminance (HSB/HSL), Hue Saturation Value (HSV), Hue Saturation Intensity (HIS), Cyan Magenta Yellow Key (CMYK), Lab, Lightness Chroma Hue (LCH), LMS, YCbCr and Y'CbCr as used in image or video, Tint Saturation Lightness (TSL), Red Green (RG), YIQ (as used by NTSC color TV system), and YUV (as used by the PAL color TV system). As would be recognized by one skilled in the art, in color spaces that do not use an integer format for a color dimension, the techniques described herein may still be applied by converting a floating point dimension value to an integer dimension value.

Each of the colors in the RGB color space, namely red, green, and blue, can be represented by a single byte of data (8 bits). By interleaving the three colors of bits (e.g., where each character represents one bit: RGBRGBRGBRGBRG-BRGBRGBRGB as will be further described in reference to FIG. 13), one can form a 24 bit integer that is uniquely representative of each color yet has only a single dimension. One advantage of interleaving the RGB bits is that the order of importance of the bits is preserved. Generally, colors which are close in terms of human perception are also close together on this integer range (e.g., they tend to have the same higher order bits).

One advantage of preserving the order of the bits is that such ordering effectively represents the 3-dimensional color values distance from black (i.e., #000000) and white ((i.e., #FFFFFF). Higher order bits generally indicate a larger distance from black (i.e., closer to white), whereas less high order bits and more low order bits generally indicate a greater distance from white (i.e., closer to black). Thus, in effect, the interleaved values may be considered grayscale values.

For each color in a data store, a column may be added to hold its equivalent 24 bit interleaved integer. A standard data store integer index may be added to a table with this column. Such an index on an interleaved color value may be considered a grayscale index value. When a search is performed based on an RGB color range, preprocessing may occur that converts the color range to a plurality of interleaved color ranges. The preprocessing may determine one or more binary splits in each individual color byte. For example, if the red color range runs between "00001110" and "00010001," then the preprocessing may convert the red color search into two ranges ("00001110" to "00001111") and ("00010000" to "00010001") that can be permuted (and interleaved) with the determined ranges from the other colors green and blue.

Figure 11:
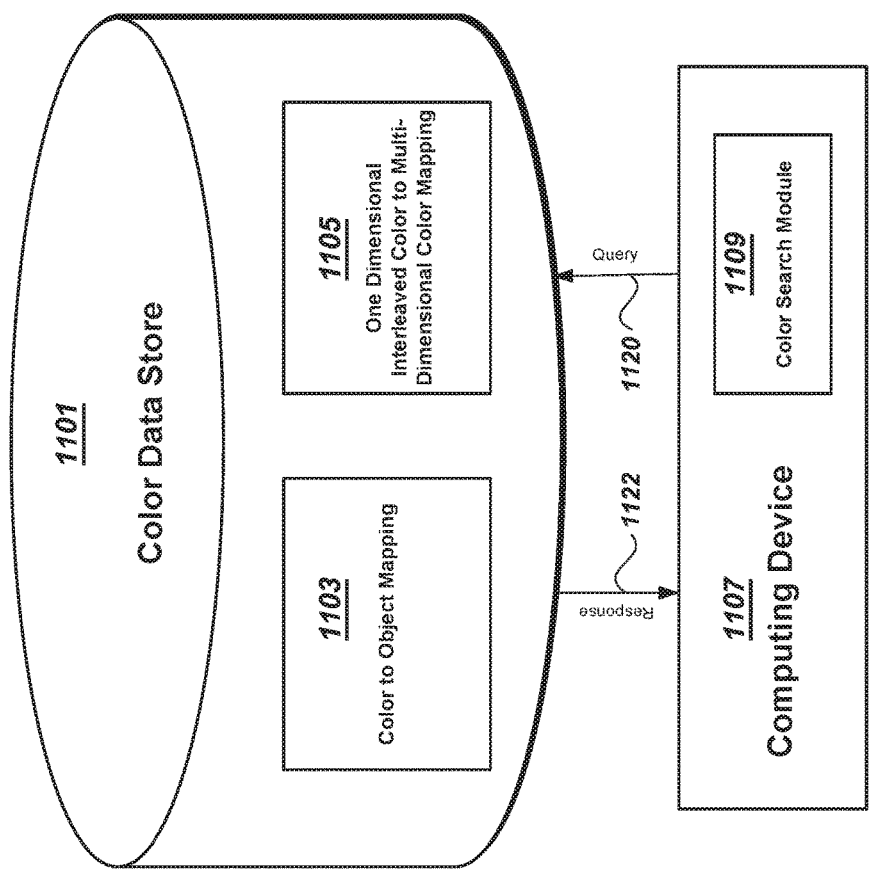
FIG. 11 is a block diagram depicting an illustrative network topology of a fast color searching system.

Turning now to FIG. 11, a block diagram is shown that illustrates a color data store 1101 that is searchable by a computing device 1107. Color data store 1101 may be any type of data store that allows for integer indexing, including a relational database such as an SQL database, or a hierarchical data store. Color data store 1101, while stored on one or more non-transitory, computer readable media, may include one or more logical data stores, each logical data store including one or more data store tables. Color data store 1101 may be implemented in a single computing device capable of executing software instructions to provide data store services, and/or many computing devices capable of together providing data store services (e.g., allowing for mirroring, backups, etc.). In yet other embodiments, color data store 1101 may be implemented as a web service or by one or more virtual machines in a hosted computing environment. The hosted computing environment may include one or more provisioned and released computing resources, which computing resources may include computing, networking and/or storage devices.

Color data store 1101 may include one or more tables with color columns. For example, table 1103 may include a plurality of records, each record including data for an object (or a reference to an object such as an object identifier) and associated with an RGB color. For example, each object reference in table 1103 may identify an item that one can buy on a network site (a jacket, a book, a stapler, a service, etc.). The item's data may be in table 1103 or in a separate table or data store accessible via the item's identifier. Each item may be associated with one or more RGB colors in the table (e.g., a color mapping). The colors associated with the object may be derived by analysis of a picture of the object. Various methods and systems for extracting colors from an image are described in U.S. patent application Ser. No. 14/316,483, entitled "IMAGE-BASED COLOR PALETTE GENERATION," filed Jun. 26, 2014; U.S. patent application Ser. No. 14/316,530; entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In some embodiments, table 1103 may contain one or more mappings of an object to a color. Multiple rows in the data store may indicate that an object, such as an image object, is mapped to RGB coded colors for pinkish/purple, Easter blue and forest green for instance. Thus, a query of table 1103 on a specific color may reveal one or more objects/items mapped to that color in the data store.

In the same table, or a separate table, such as table 1105, the RGB colors may be mapped to a one dimensional integer value. The one dimensional integer value may include interleaved bits of the RGB coded colors. For example, if the color coding for Easter blue is #44EDE5, then the interleaved 24 bit integer may look like 011111011000010111000011 (as represented in bits). Interleaving is further described with reference to FIG. 13 described herein. In some embodiments, tables 1103 and

1105 may be the same, where objects may be mapped directly to the flattened one dimensional 24 bit integer representation of a color.

The data store table(s) may be queried using the 24 bit integer to determine one or more objects associated with a color. In some embodiments, the data store 1101 may receive an SQL query to determine if one or more objects have an associated color within the color range. For example, an SQL "where" clause statement may be a parameter that is used to search on a color range (e.g., "where 24intcolor between '239874' and '736583'"), where values in column "24intcolor" are the interleaved 24 bit colors. Using a mapping of the 24 bit color to the RGB color (or, in some embodiments, simply mapping straight to an object) allows the data store to identify and return those objects that are associated with the range of colors searched.

Color data store 1101 may be connected to many devices, directly or indirectly, on a network (e.g., a private network, the Internet, etc.) that allows the data store to receive queries and transmit search results. The data store may be one device (e.g., a data store server), multiple devices, or in remote computing devices such as remotely hosted on the Internet/cloud.

Computing device 1107 may be able to issue a query 1120 and access the data store 1101 via networking such as IP networking (Internet, intranet, combination of both, etc.). Computing device 1107 may be a server (or a server farm or hosted computing device(s)) that has received a client color inquiry, processed the inquiry via a color search module 1109, and generated one or more interleaved color ranges as described herein. The query 1120 may then be sent to the data store 1101 for resolution. The data store 1101, after receiving the query 1120 (e.g., an SQL query), may process the query 1120 and return a response 1122 including search results after comparing the interleaved color ranges to the interleaved color ranged index (e.g., included in table 1105). Such a comparison may result in one or more matching colors or objects (e.g., items or images) that may be returned in a response 1122. The computing device 1107 may then use the returned colors and/or objects for any purpose (e.g., returning an item to a client device, showing matching colors to a user that falls within the specified range, etc.).

In some embodiments, color data store 1101 may be connected to computing device 1107 directly rather than through a traditional communication network. For example, the computing device 1107 may store color data store 1101 and execute a data store process to answer queries, as well as execute network server (or other server) processes to accept user color queries through the Internet, or through a local user interface. The color search module 1109 may then process the color queries, send interleaved color ranges to the data store processes, and receive a response.

In some embodiments, the computing device 1107 may include a user device (e.g., a home or office computer, smartphone, tablet, a wearable computing device, etc.) that includes an arrangement of computer hardware and software components such as a processing unit, a network interface, a non-transitory computer-readable medium drive, and an input/output device interface, all of which may communicate with one another by way of a communication bus. The network interface may provide for connectivity to one or more networks or computing systems. The processing unit may thus receive information and instructions from other computing devices, systems, or services via a network. The processing unit may also communicate to and from memory and further provide output information via the input/output device interface. The input/output device interface may also accept input from various input devices, such as a keyboard, mouse, digital pen, touch screen, etc. The memory of the computing device 1107 may contain computer program instructions, such as the color search module 1109, that the processing unit may execute in order to implement one or more embodiments of the present disclosure. The memory generally includes RAM, ROM and/or other persistent or non-transitory computer-readable storage media.

In addition, the memory may include a user browser. The user browser may have contacted a network site, e.g., a website, and loaded a graphic user interface based on information received from a remote server. The user browser may be used to initiate a search. For example, the user browser may obtain a color range to search, and in some embodiments additional search parameters, such as keywords, item price, type of item/object, etc. Such additional parameters may be used to further filter the search results in addition to color. The color search module 1109 may execute on the computing device 1107, either within the browser (e.g., via a JAVASCRIPT® module) or outside the browser to preprocess the range and generate one or more interleave ranges to search via the color search query 1120. At this point, the query 1120 may be sent to the color data store 1101, processed via comparison of the 24 bit integer color index to the 24 bit interleaved search ranges, and a response 1122 generated and sent back to the computing device 1107. The response 1122 may be further filtered based on additional query parameters described above. Once the response 1122 is returned, the browser or other process may generate a graphical user interface to display and/or interact with one or more of the search results.

Search performance for color data store 1101 may be improved by implementing color data store 1101 across multiple sub-data store systems. In such a scenario, each sub-data store that makes up color data store 1101 may be responsible for answering queries for specific, predefined color ranges. By way of example, in a simple scenario, color data store 1101 could be implemented by using three sub-data stores. Each sub-data store may be configured to receive queries for specific interleaved color ranges, such as sub-data store #1 responding to queries where the flat one dimensional color starts with a "0" highest order bit, sub-data store #2 responding to queries where the flat one dimensional color starts with a "10", and sub-data store #3 responding to queries where the flat one dimensional color starts with "11."

The ranges assigned to each sub-data store may be configured manually, or automatically, based on the density of index color values within each sub-data store. In one embodiment, an algorithm may configure a sub-data store to handle a larger, sparsely-populated color range, and configure another sub-data store to handle a smaller, but more densely-populated, color range. Such an algorithm may be executed without human intervention so as to adjust each sub-data store on the fly based on the population of possible results within specific color ranges. This approach may spread out the records in color data store 1101 across the sub-data stores according to the processing power of each sub-data store.

In a multiple sub-data store scenario, a computer creating a search query may then craft separate queries for each sub-data store system, send them out in parallel to each sub-data store system, and receive results in parallel. This parallelism may create a performance increase by querying multiple, smaller sub-data stores at the same time.

The color data store 1101, and in particular, a table (such as table 1105) that includes a one dimensional interleaved color mapping (e.g., a 24 bit interleaved integer) to a multi-dimensional color mapping (e.g., RGB color or an item with an affiliated color) may be generated to support fast color queries as described below in FIG. 2.

Figure 12:
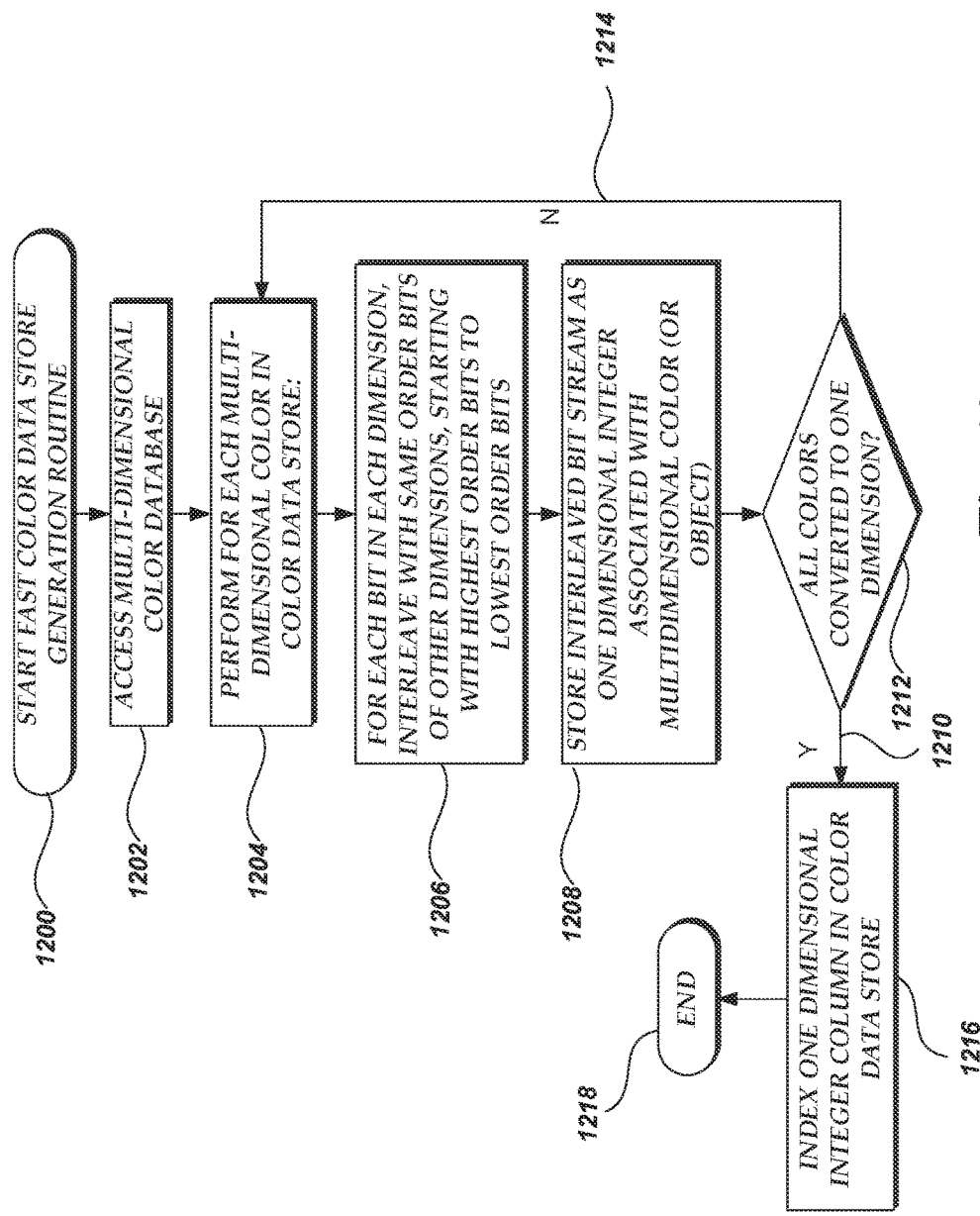
FIG. 12 is a flow diagram illustrating an example of a process for generating or configuring a fast color search data store included in FIG. 11.

With reference now to FIG. 12, an embodiment of a fast color data store generation routine 1200 is implemented by an accessing computing device, such as the computing device 1107, will be described. One skilled in the relevant art will appreciate that actions/elements outlined for routine 1200 may be implemented by one or many computing devices/components/modules that are associated with the computing device 1107, such as the color search module 1109, or associated with the color data store 1101. Accordingly, by way of example, routine 1400 has been logically associated as being performed by the computing device 1107.

At block 1202, a computing device 1107 may access the color data store 1101 (e.g., login to the data store or otherwise prepare to perform queries and store data in the data store). The accessing computing device may be computing device 1107, or any other computing device capable of interacting with the color data store 1101, including any computer device that implements the color data store 1101.

Figure 13:
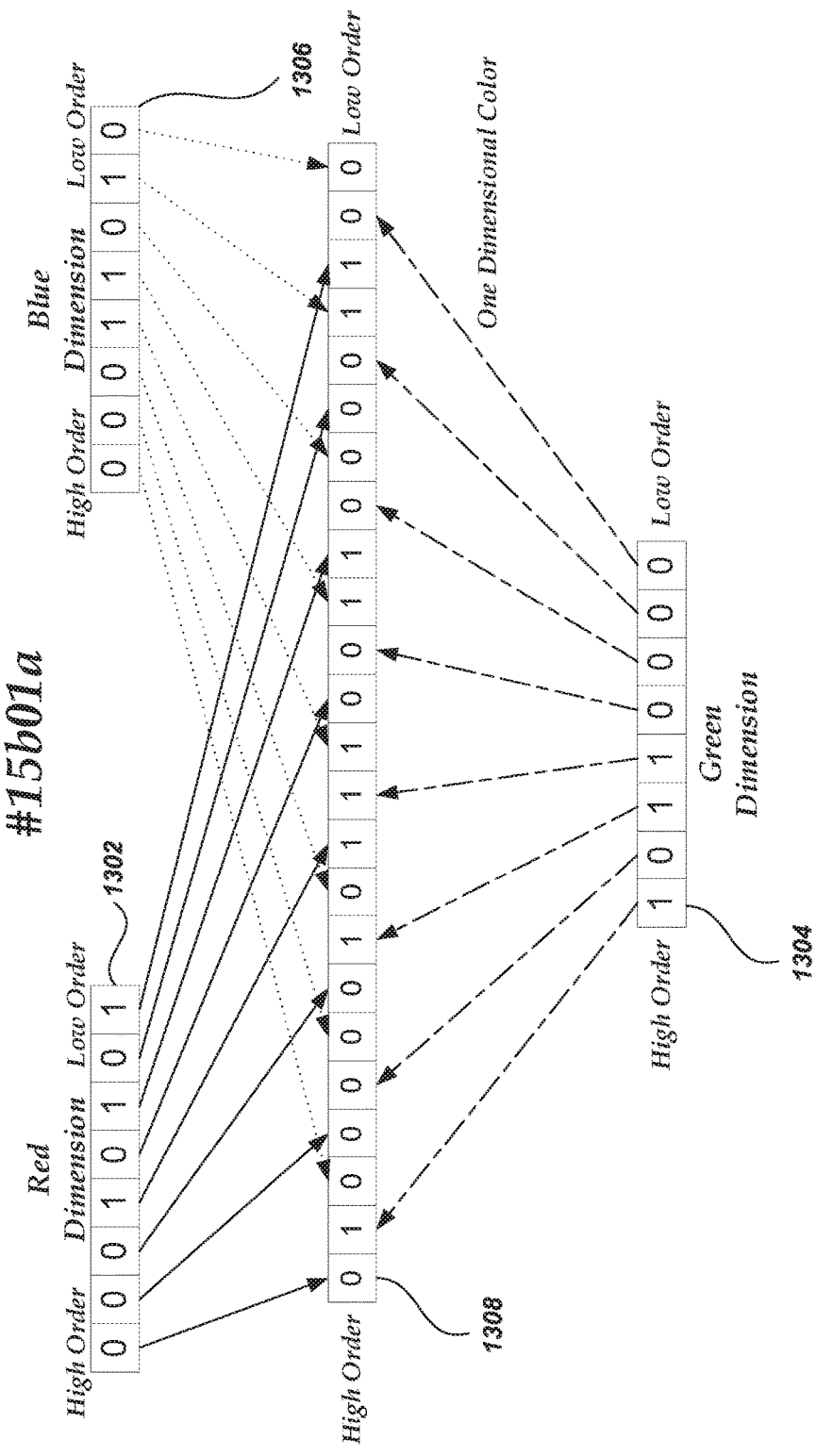
FIG. 13 is a schematic diagram illustrating an example of interleaving bits to transform a multi-dimensional color model to a one dimensional representation of a color.

At block 1204, the computing device 1107 may query and access each color used or available in the color data store 1101. Then, at block 1206, for every color in the multi-dimensional color data store 1101, the computing device may interleave the bits from each dimension of the multiple dimensions in the color data store 1101. For example, as illustrated in FIG. 13, which is further discussed below, the red dimension bits, the green dimension bits, and the blue dimension bits in an RGB color value may be interleaved to form a 24 bit integer. FIG. 13 discloses one example of how interleaving may be performed throughout this application.

In FIG. 13, the RGB color #15b01a may correspond to what is commonly known as "green." This green color, being a part of the RGB three dimensional color space, has three dimensions (red, green, and blue) that may respectively be represented in decimal (21, 176, 26), hex (15, b0, 1a) or bits (00010101, 10110000, 00011010). The bits of the red dimension 1302 may be ordered from highest to lowest, from left to right (e.g., big endian, smaller memory address to higher memory address). For example, the magnitude of a red light (e.g., LED "brightness") to display in combination with the other colors may be scaled according to the value of the red dimension. Each bit is valued according to its normally 8 bit/1byte integer weight. Thus, a "1" in the highest order bit is valued at 128 (2 to the 7th power ($2^7$)), whereas a 1 in the lowest order bit is valued as a 1 ($2^0$). For the example red dimension value 1302, the values are 00010101, which are values for the bits called R7, R6, R5, R4, R3, R2, R1, and R0, respectively.

Similarly, the magnitude of the green light to display in combination with the red and blue lights may be scaled according to the bits in green dimension 1304. For the example green dimension value 1304, the values are 10110000, which are values for the bits called G7, G6, G5, G4, G3, G2, G1, and G0 respectively. Likewise, the blue dimension values 00011010 are values for the bits B7, B6, B5, B4, B3, B2, B1, and B0 respectively.

A 24 bit integer value may then be formed that interleaves all of the bits of the red, green, and blue dimension values such that their order within a dimension is preserved. For example, 24 bit integer 1308 may now include, after being interleaved, 010000010111001100001100. This value corresponds to interleaving the bits in the following order: R7 G7 B7 R6 G6 B6 R5 G5 B5 R4 G4 B4 R3 G3 B3 R2 G2 B2 R1 G1 B1 R0 G0 B0. Other possible examples may include altering the order of the RGB bits (e.g., green first G7 B7 R7 G6 B6 R6 . . . etc.), reversing the order of the bits which may, for example, be used for little ending systems (R0 G0 B0 R1 G1 B1 R2 G2 B2 R3 G3 B3 R4 G4 B4 R5 G5 B5 R6 G6 B6 R7 G7 B7, or even B0 G0 R0 B1 G1 R1 B2 G2 R2 B3 G3 R3 B4 G4 R4 B5 G5 R5 B6 G6 R6 B7 G7 R7). One skilled in the art would understand how to implement a multi-dimensional color interleaving system using little endian ordering by using a reverse bit order. Additional alternative interleaved bit orderings may also be used that allow for 24 bit integer color range searching.

Returning to FIG. 12, at block 1208, for every RGB color converted to a 24 bit integer, the 24 bit one dimensional integer may then be stored in the color data store 1101 in association with the associated multidimensional color (such as in table 1105 in association with an RGB color), which may be indirectly or directly associated with an object in the color data store such as an item (e.g., an item identifier). In some embodiments, the 24 bit integer may be stored in direct association with an object in the color data store 1101 (e.g., a mapping to an item identifier in a single table).

At block 1212, the fast color data store generation process may determine whether all colors have been converted to a single 24 bit color 212. If not, arrow 1214 indicates that the process may repeat and more colors can be converted and stored in the color data store 1101. Otherwise, as indicated by arrow 1212, the process of converting all the colors may end.

At block 1216, the color data store 1101 may then index a column in a table storing the generated one-dimensional interleaved integer representing a color to enable fast range searching based on the one-dimensional integer. After indexing, the fast color data store generation process may end at block 1218. The color data store 1101 is now able to perform a fast color search when a query is received.

Figure 14:
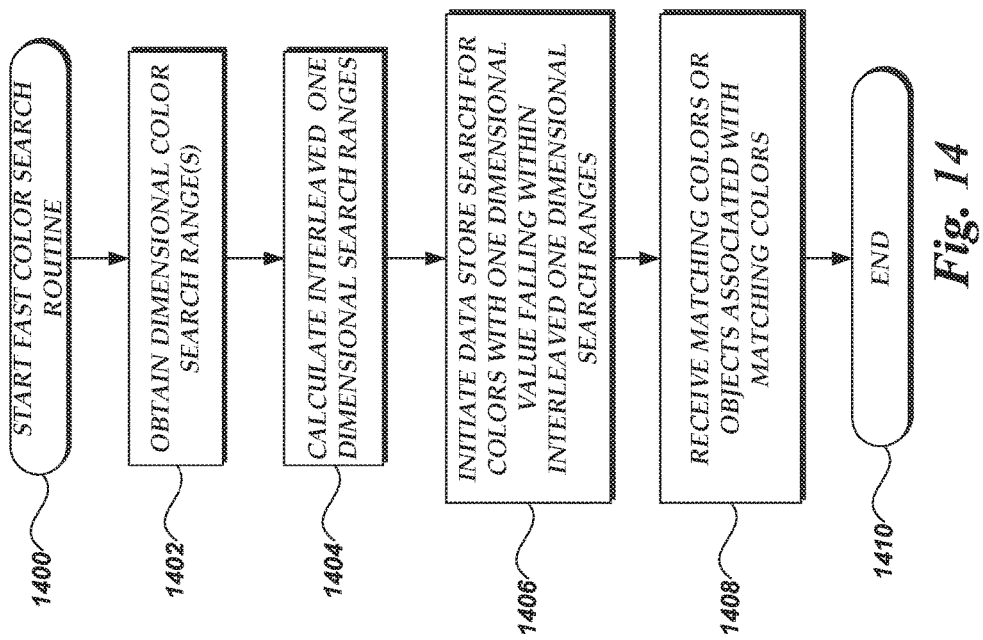
FIG. 14 is a flow diagram illustrating an example of a process for fast color searching.

FIG. 14 illustrates one embodiment of a routine executing on one or more computing devices, such as computing device 1107, for searching a fast color search data store such as color data store 1101. Such a routine may be performed by software instructions executed by a hardware processor and may include one or more components of the color search module 1109. The software instructions may be stored for execution in a non-transitory storage medium, such as one or more registers, memories, magnetic disks, flash memories, solid state drives, etc.

With further reference to FIG. 14, an embodiment of a fast color search routine 1400 implemented by an accessing computing device, such as the computing device 1107, will be described. One skilled in the relevant art will appreciate that actions/elements outlined for routine 1400 may be implemented by one or many computing devices/components/modules that are associated with the computing device 1107, such as the color search module 1109. Accordingly, routine 1400 has been logically associated as being performed by the computing device 1107.

At block 1402, the computing device 1107 obtains an input for a color range to search. In some embodiments, this input may include input from a man/machine interface, such as through a keyboard, mouse, etc., as input into a graphical user interface, such as a browser. For example, a user may browse a network site and input one or more RGB colors or color ranges to be searched. Such a color (e.g., an RGB value) may be selected via a color picker interface, a curated color palette, a color palette pulled from an image, an item that has one or more colors associated with it (e.g., to find other items with similar colors), a color determined from a keyword to color translation, or other method. In some embodiments, a color range to search may be obtained via the network, such as via a server receiving one or more packets from a client device containing color ranges to search. Various methods and systems used to obtain one or more colors or color ranges are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety.

If a color range is not obtained, but instead a single color is obtained, one or more color ranges to be searched may be determined based on one or more selected colors. In some embodiments, a color range may be determined based on a configurable color range that can be applied to a color. For example, if green color "#15b01a" is obtained, a color range may be determined by adding and subtracting from one or more color dimensions, a set value (for example, 4 color magnitude). Such an example would create a range of between (in hex) "11" to "19" in the red dimension, "ac" to "b4" in the green dimension, and "16" to "1e" in the blue dimension.

In another embodiment, the color range(s) may be determined by applying a human recognizable color distance/difference formula. Such a formula may generate one or more dimensional color ranges for a given RGB value that may be imperceptible to human detection based on a given starting color, and may be considered the same color as the starting color for human purposes. In an embodiment, the color search range may include those colors not detectable as different by a human, and/or may include those search ranges barely detectable as different by a human. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In yet another embodiment, the color range(s) may be determined based on the output of a previous item search through the use of a color adjustment user interface that allows for modification of a previously searched color. Unlike a color picker user interface that allows for the selection of a color, a color adjustment user interface may include a GUI slider that allows for searching, based on a given color or color range or a wider or narrower range of color; or allows the searched color or color range to be shifted to become more intense, darker, brighter, etc. The previous item search may be the result of a previous color search queried by color alone or in combination with other criteria (such as keywords, price, etc.). In such a scenario, a user interface may display all of the items such that the resulting items can be browsed and examined, and have the color adjustment user interface integrated therein. The user interface may be a network page that allows for scrolling through a plurality of search results. The network page may include a slider that allows for selection of tighter or broader color ranges.

For example, a user on computer device 107 may have selected the color green "#15b01a" from a network-based color picker user interface, and sent an item search to a network server along with the keyword "handbag." The computer device 107 may translate the green color into a color search range within a first threshold around the green color, for the query to include the color search range and the keyword "handbag," and transmitted the search criteria to color data store 1101. Once a response was received, the computing device 1107 may display all of the items and their associated images within a browser on a network page. The network page may have a slider user interface element that allows for the color search range to be adjusted upwards by sliding the interface in a first direction. Sliding in the first direction may direct computing device 1107 to resubmit the search with a wider or broader color search range than in the previous search. The color search range may be widened in a ratio consistent with an amount the slider was moved in the first direction.

Similarly, the previous color search range may be adjusted downward by a user sliding the slider in a second direction, which may cause the color search range to decrease in a ratio consistent with an amount the slider was moved in the second direction.

Once the slider or other adjustment user interface has been altered, the new search may be initiated based on the widened or narrowed color search range criteria. The search results in the response would thus be widened or narrowed in accordance with the new color search range. In this manner, a user can "see more" results matching a given color by widening a color search range, or "see less" results by narrowing the color search range.

In other embodiments, color(s) or color search range(s) may be obtained from other sources, including preexisting color palettes, opposite colors, opposite color palettes, color to keyword mappings, etc. Various methods and system for obtaining color(s) and color search range(s) are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety. Other parameters may also be specified as a part of a color search query to further filter desired results of the query. Such parameters may include keywords, item price, type of item/object, etc.

At block 1404, preprocessing may occur to form a fast color search query. For example, at block 1404, a process may generate, based on the obtained RGB color search ranges, one or more 24 bit integer search ranges to include in one or more color search queries. Further, at block 1404, one or more color search queries may be properly formulated. For example, once the 24 bit integer color search ranges have been generated, those ranges may be formed into one or more formatted SQL queries, API queries, web service queries, etc. Preprocessing is further described below with reference to FIG. 15.

At block 1406, computing device 1107 may initiate a search query. Initiating a search query may include transmitting a search query including the color range(s) to be searched over a network (e.g., local area network, Internet, VPN, etc.) by computing device 1107 to color data store 1101 or other color query enabled service such as a web service or color search server. In some embodiments, no transmission may be needed, as the color search module 1109 may have direct or local access to a color data store 1101, or may be able to execute the query itself via direct access to data store files (e.g., using SQLite).

At block 1408, once all 24 bit integer search ranges has been searched, the desired data store records that match or otherwise correlate to one or more of the searched ranges are received by the querying computing device, e.g., through a local process, or transmitted back to the computing device 1107 through the network and received by the computing device 1107. Such a search result may return one or more matching RGB colors, RGB color palettes, or even 24 bit integers that may be de-interleaved to determine an RGB color. In some embodiments, the search result may return objects (such as items) associated with the one or more 24 bit integer color search ranges that were requested in the query.

The search results may be compiled by the color data store 1101 or color search module 1109 by comparing the specified integer color search ranges in the query to the index of the 24 bit column. For example, an index may be a tree data structure where, by making integer comparisons to nodes in the tree, the tree may indicate one or more rows that match an integer search range. One advantage is that this is more efficient than a comparison of each row in the data store to the color range, or a comparison of each dimension's search range to three different indexes in a data store.

At block 1410, the color search routine may end, and the computing device 1107 may use the search results for further processing, or format and display the search results in a user application such as a browser.

Figure 15:
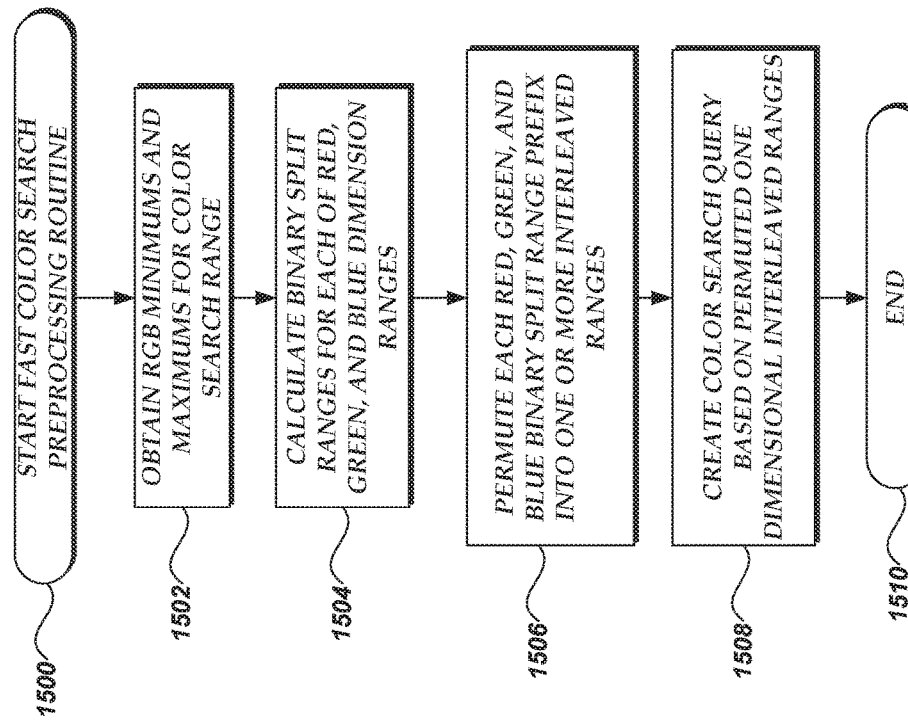
FIG. 15 is a flow diagram illustrating an example of a process for fast color search preprocessing.

With reference now to FIG. 15, an embodiment of a fast color search preprocessing routine 1500 implemented by an accessing computing device, such as the computing device 1107, will be described. One skilled in the relevant art will appreciate that actions/elements outlined for routine 1500 may be implemented by one or many computing devices/components/modules that are associated with the computing device 1107, such as the color search module 1109, or alternatively by color data store 1101 (e.g., when RGB color range(s) are specified in a transmitted search query by a user computing device, and a server or data store must translate the received RGB color range(s) into 24 bit integer search ranges prior to searching). Accordingly, routine 1500 has been logically associated as being performed by the computing device 1107.

FIG. 15 illustrates one embodiment's preprocessing of an RGB color search range that may be performed by the color search module 1109. One skilled in the art will see that the preprocessing may be quickly extrapolated to any other multi-dimensional color arrangement other than RGB. For example, the computing device 1107 may have a color search module 1109 including JAVASCRIPT® instructions that may run in a browser. The JAVASCRIPT® instructions may preprocess one or more color search ranges prior to forwarding the ranges to a network server or data store server for searching. One of the advantages of using JAVASCRIPT® is that the processing load of an organization's data stores and servers may be reduced by having user operated computers perform preprocessing for a color search query instead. In addition to JAVASCRIPT®, one skilled in the art will recognize that other programming languages may also be used to implement the fast color searching techniques described herein, whether the resulting code is executed on the user computer side, the server(s) side, or in some combination thereof.

At block 1502, the computing device 1107 that is performing the preprocessing may obtain RGB color range values. The color range values may include a red maximum color value, a red minimum color value, a green minimum color value, a green maximum color value, a blue maximum color value, and a blue minimum color value. Embodiments may then translate these dimensional color ranges into one or more one dimensional 24 bit integer color search ranges that may be used in a fast color search query. An example process is described below with respect to blocks 1504, 1506, and 1508.

At block 1504, each dimensional color's range (e.g., minimum to maximum) may be further split, by the computing device 1107, into additional ranges across bit boundaries so that interleaved values may appropriately be searched in one dimension. These may be called binary split ranges or prefixes.

As an illustration of the problem to be solved is as follows. Assume the color search ranges of:
Red minimum: Hex-7e Binary-01111110
Red maximum: Hex-81 Binary-10000001
Green minimum: Hex-00 Binary-00000000
Green maximum: Hex-01 Binary-00000001
Blue minimum: Hex-fe Binary-11111110
Blue maximum: Hex-ff Binary-11111111

When interleaved, the result might appear to create the search range of, in binary: 001101101101101101101000 (interleaving all the minimum values) through 101001001001001001001111 (interleaving all the maximum values), which corresponds to the decimal integer range of 3,595,112 through 10,785,359. However, matching integer based colors within that range may not actually be within the color range to be searched. For example, 4,194,304, which may correspond to the interleaved bit value 010000000000000000000000 and corresponds to the RGB color in hex of #008000 (i.e., a green value of #80), is not actually within the range to be searched (#7f00fe through #8101ff green does not vary more than between 00 and 01), but does satisfy the criteria of being between 3,595,112 and 10,785,359. This error situation may occur because of bit carryovers from the interleaved values of the various colors. In other words, the carryovers in ranges in 24 bit integer interleaved form affect other dimensions' color values, which is an unintended consequence and makes some colors match a color search range in integer format when a color does not actually match the original color search range.

Such a situation may be avoided via preprocessing before a search query is executed. For example, the preprocessing for the above range will split integer search ranges where a carryover will affect a range to be searched. Instead of searching a single integer range from 3,595,112 through 10,785,359, two ranges can be searched instead: 001101101101101101101000 through 001101101101101101101111, and 101001001001001001001000 through 101001001001001001001111, corresponding to the ranges in decimal integer of 3,595,112 to 3,595,119, and 10,785,352 to 10,785,359, respectively. These split search ranges now appropriately capture the entire search range (e.g., the original search range #7f00fe through #8101ff is equivalent to ranges #7f00fe through #7f01ff and #810fe through #8101ff combined).

In some embodiments, postprocessing, rather than preprocessing, may be used to implement a fast-color search. In embodiments where data store records sparsely populate color search ranges, the identification of split integer search ranges may be performed on computing device 1107. Under this scenario, using the same example above, color data store 1101 may be searched by computing device 1107 using the larger range 3,595,112 through 10,785,359. Because records sparsely populate that range in color data store 1101, a limited number of query results may be returned. Because only a limited number of search results are expected to be returned, computing device 1107 may determine each split search range after issuing its query to the data store (instead of before), and analyze each individual query result to determine whether it falls within any of the determined split search ranges. One of the advantages of this type of embodiment is that it moves processing from color data store 1101 (e.g., comparison of each smaller split search range) to computing device 1107, thus reducing the overall load on color data store 1101. This type of implementation may also be used in combination with a color data store 1101 made up of multiple sub-data stores because under that scenario the sparseness of each sub-data store can be controlled to make post-processing an optimal strategy.

Thus, at block 1504, binary split ranges may be determined for each RGB color dimension by determining high order bit prefixes that can be filled out with the remaining bits as 0s or 1s to determine a split search range. Binary split ranges can be determined by calculating one or more range prefixes for the minimum and maximum values of a color dimension, and combining these range prefixes into a list of range prefixes for a given dimension.

For example, for the red color search range, one prefix (the base prefix) may be identified by determining the highest order bit of the minimum value that has the value of "1" as a minimum, and then using the minimum as a lower bound with the upper bound being all previous 0s. If the red color search range was from 00001010 (minimum red value) through 00010000 (maximum red value), then aforementioned prefix may correspond to the bit prefix of 0000101 of the minimum value. This prefix may be thought of as a range (e.g., binary split range) which corresponds to a range of 00001010 through 00001011 (i.e., a range based on the prefix where the remaining bits (underlined) are all filled out with 0s for the minimum of the range, and is for the maximum of the range). Thus, the prefix value 0000101 may be added to a list of prefixes for the red color.

More prefixes may be identified by computing device 1107 based on the minimum value. One criterion for identifying additional prefixes involves examining the base prefix. Starting from the lowest bit, if there are any additional higher order bits in the base prefix that have a 0 (e.g., 0000101), an additional prefix may be identified if the additional prefix includes lower order bits than the highest order bit of the minimum value bit that equals 0, and the maximum bit of that order is a 1. This bit may be referred to as a "divergent" bit, since it is the bit where the maximum value begins to diverge from the minimum value). Such a prefix may then be finally identified by replacing the identified "0" with a "1." More than one additional prefix may exist within the base prefix.

Returning to our example, the minimum value has such a matching zero, 00001010, and the prefix includes 000010, which includes lower order bits than divergent bit (here underlined where the bit strings diverge: min: 00001010 and max: 00010000). The identified prefix contains bits of a lower order than the divergent bit (e.g., the fifth and sixth lowest order bits). Since 000010 has been identified, the actual prefix to add is 000011 ("... the prefixes may then be included by replacing the identified '0' with a '1'"). Thus, this would identify the additional prefix of "000011" and add it to the list of prefixes for the red color (which already contained 0000101).

Another set of prefixes may be determined by computing device 1107 by analyzing the maximum bit value for a color. The computing device 1107 may identify the lowest order bit value of the maximum value that is a 0, and taking as a prefix the identified value 0 bit, and all higher order bits. Thus, 00010000 would be added as a prefix to the growing list.

Another set of prefixes that may be added are any prefixes of the maximum value where the maximum value has a bit of "1" after the divergent bit. These prefixes may then be included by replacing the identified "1" with a "0."

In the afore-mentioned example, no additional prefixes would be identified, as the maximum red value is 00010000, and has no bits with a "1" value after the divergent bit. However, if the maximum red value was actually 00010100, then the second "1" would identify a prefix, 000101, the second "1" would then be replaced with a "0" (to form prefix 000100), and the prefix 000100 would be added to the list of red prefixes.

Although the example above determined a list of binary split ranges (e.g., a prefix list) for red values, a list of binary split ranges may be determined for the blue and green dimensions similarly, or any dimension of a color space. Thus, a list of binary split ranges/prefixes may be determined for each color dimension, and specifically for the red, green, and blue dimensions based on the maximum and minimum values in a range to be searched for each dimension.

Returning to FIG. 15, at block 1506, the prefixes may be permuted and interleaved by computing device 1107. Each such permutation may be converted into one or more 24 bit integer ranges for searching (or other n-dimensional interleaved bit integer range depending on how many bits makeup a dimension, and how many dimensions make up the color model).

For example, using RGB, there may be three prefix lists — one for red, one for green and one for blue. Each prefix in the red list may be permuted with all of the other prefixes for the other colors, so that the computer determines all possible combinations of prefixes that have one prefix from the red list, one prefix from the green list, and one prefix from the blue list. Each permutation can be interleaved and converted into one or more 24 bit integer search ranges.

Figure 16:
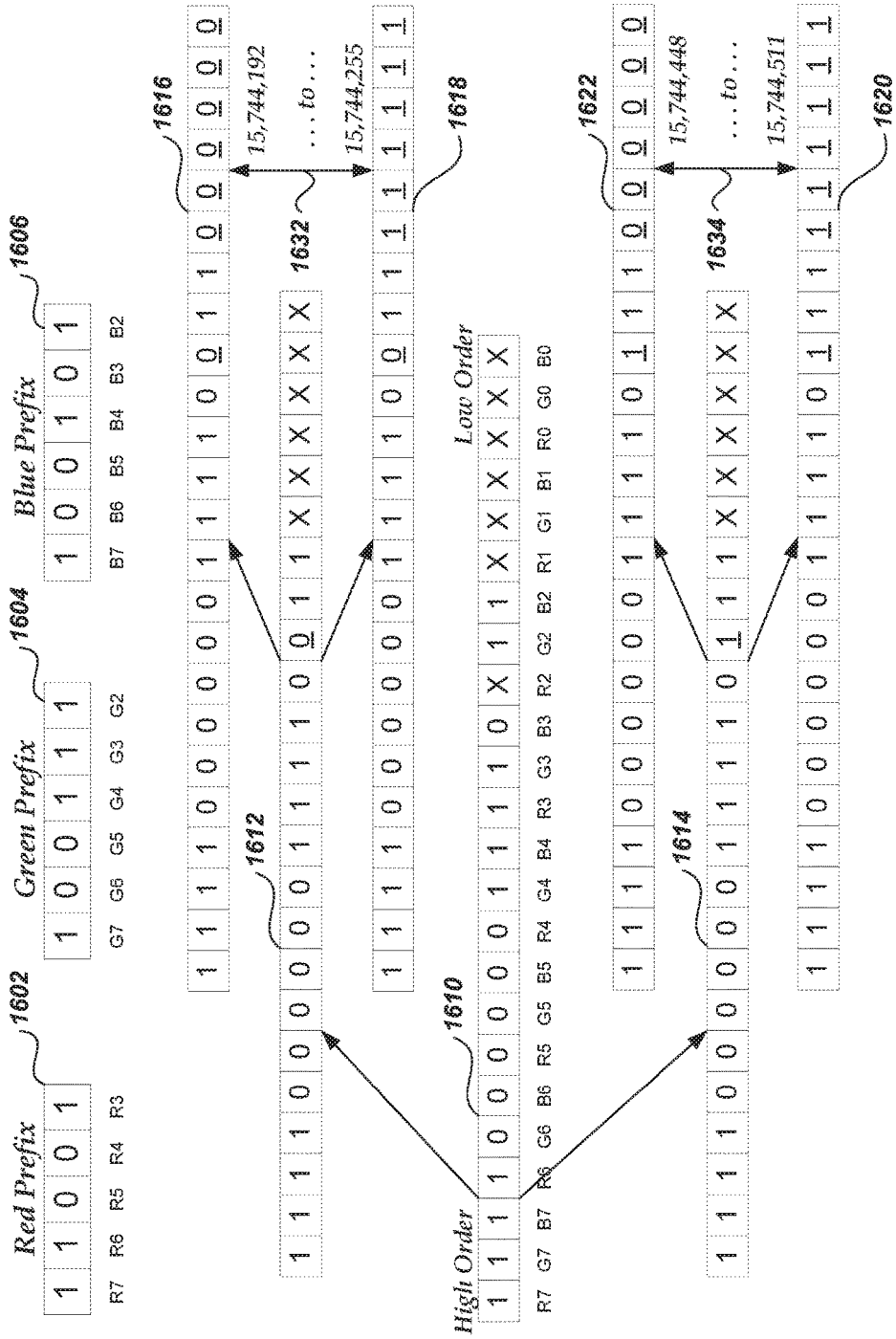
FIG. 16 is a schematic diagram illustrating an example of interleaved one dimensional color ranges computed from a permutation of range prefixes.

FIG. 16 illustrates an example of interleaving and conversion of a particular permutation by computing device 1107. For this example permutation, a red prefix 1602 has been selected (11001), a green prefix 1604 has been selected (100111), and a blue prefix 1606 has been selected (100101). These bits may then be interleaved based on their bit order, such as described in FIG. 13. However, a number of bits are not present in the prefixes. For example, the red prefix is missing the last three bits, and the blue and green prefixes are missing the last two bits. This creates an interleaved bit structure that would be incomplete. For example, interleaved bits 1610 shows an interleaved string with missing bits (Xs) based on these prefixes, and thus showing that the R2 bit is missing, and the R1, G1, B1, R0, G0, and B0 bits are also missing.

There may be two types of missing bits. The first type may be a missing bit that has lower order bits in the 24 bit integer that are defined. This may be called an "interior split bit." For example, the bit labeled R2 in interleaved bits 1610 is missing, as indicated by the "X." However, the bits G2 and B2, are defined (e.g., were included in the selected green prefix 1604 and blue prefix 1606) and are of a lower order in the 24 bit string ("lower order" here, for this 24 bit interleaved integer, means "comes after" or of a lower order when the 24 bit interleaved integer is considered a normal integer).

When a bit of the first type is identified, the permutation of red, green, and blue prefixes may be split into two identical permutations for further range determination, where a first permutation 1612 has a "0" for the identified bit, and a second permutation 1614 has a "1" for the identified bit (as indicated by the underlined bit values in interleaved 24 bit integers 1612 and 1614). Further missing bit analysis may then be performed on these two similar permutations of the prefixes with only one bit of difference. The original permutation, here permutation 1610, need not be further analyzed. This type of split may be performed again and again until there are no more interior split bits within any of the resulting permutations.

A second type of missing bit may also be identified. This missing bit may be identified by determining that the missing bit does not have any defined bits of a lower order. For reference, this missing bit may be called an "ending range bit." When this type of bit is identified, and usually after all interior split bits have been resolved through a split into two identical permutations with only a one bit difference, then a permutation may be converted to a 24 bit range. This is done by calculating two 24 bit integers: a lower bound of the range which is determined by taking the permutation and setting all remaining ending range bits to "0," and another upper bound of the range which is determined by taking the permutation and setting all remaining ending range bits to "1."

For example, interleaved 24 bit permutations 1612 and 1614 have remaining ending range bits, corresponding to R1, G1, B1, R0, G0, and B0 (in other words, the last 6 bits of the interleaved 24 bit integer). Because there are no defined bits of lower order than the ending range bits, these bits may now be used to form an integer search range. For permutation 1612, the lower bound may be determined by setting the ending range bits to 0 (as shown in permutation 616), which equals the integer 15,744,192. The upper bound may be determined by setting the ending range bits to 1 (as shown in permutation 1618), which equals the integer 15,744,255. Thus, one calculated search range 1632 may be a query range for an interleaved color value between 15,744,192 and 15,744,255.

For permutation 1614, the lower bound may be determined by setting the ending range bits to 0 (as shown in permutation 1622), which equals the integer 15,744,448. The upper bound may be determined by setting the ending range bits to 1 (as shown in permutation 1620), which equals the integer 15,744,511. Thus, one calculated search range 634 may be a query range for an interleaved color value between 15,744,448 and 15,744,511. All of the identified 24 bit color search ranges, over all of the permutations of prefixes, may be collected and stored to be searched.

Returning to FIG. 15, after determining one or more permuted one dimensional interleaved color search ranges as described above, one or more color search queries may be formed at block 1508. One example embodiment may generate an SQL "where" clause to string together multiple 24 bit integer color search ranges in a query (e.g., an SQL "select" statement). For example, a clause such as "SELECT * FROM <table 1105>WHERE (interleave_rgb_color BETWEEN 15744448 AND 15744511) OR (interleave_rgb_color BETWEEN 15744192 AND 15744255)," where the query lists all search ranges, may be one such crafted query based on the examples above. However, the query would likely be much longer if there are further permutations of red, green, and blue prefixes that may be combined to form unique search ranges, each of which may produce one or more search ranges depending on the number of interior split bits. All of the resulting ranges may be used to form a query, or multiple queries, for total range coverage of a traditional multi-dimensional color search query. In other embodiments, a properly formatted web service query may incorporate the determined integer color ranges to search by adding the ranges as parameters to a search.

After the search query(ies) are generated, at block 1510, the preprocessing routine may end. The search may now be transmitted or executed, as described with reference to FIG. 14 (e.g., block 1406).

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHONTM, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for generating a color palette, the computer-implemented method comprising:
    under control of a hardware computing device configured with specific computer-executable instructions,
        obtaining a first input color and a second input color;
        determining a first input color range based at least in part on a first color distance from the first input color in a color space and a second input color range based at least in part on a second color distance from the second input color in the color space;
        receiving a plurality of color palettes, each of the plurality of color palettes having a plurality of colors and a rating;
        identifying one or more affiliated color palettes among the plurality of color palettes, wherein an affiliated color palette has at least one of: a first color within the first input color range or a second color within the second input color range, wherein identifying the one or more affiliated color palettes further comprises:
            calculating an integer search range, wherein calculating the integer search range further comprises interleaving bits from at least one of the first input color range or the second input color range;
            initiating a search of a data store based at least in part on a search query comprising the integer search range as a search parameter, the data store comprising a record associated with at least one indexed integer color value; and
            receiving a search result from the data store, the search result comprising a first record associated with a first indexed integer color value for at least one of the first color or the second color, the first record further associated with a first color palette of the one or more affiliated color palettes;
        generating a list of a plurality of affiliated colors, wherein an affiliated color is a color included in an affiliated color palette and the affiliated color is outside at least one of: the first input color range or the second input color range;
        calculating a first cumulative weight and a second cumulative weight of each affiliated color in the list of the plurality of affiliated colors, the first cumulative weight corresponding to a first aggregation of one or more ratings of the one or more affiliated color palettes having the affiliated color and the first color, the second cumulative weight corresponding to a second aggregation of one or more ratings of the one or more affiliated color palettes having the affiliated color and the second color;

calculating an adjusted weight of each affiliated color, wherein calculating the adjusted weight further comprises:
scaling a respective cumulative weight by a total number of the one or more affiliated color palettes having the affiliated color and at least one of: the first color or the second color; and
multiplying the first cumulative weight and the second cumulative weight;
selecting a subset of affiliated colors from the plurality of affiliated colors based at least in part on the adjusted weight of each affiliated color from the plurality of affiliated colors; and
causing presentation of the subset of affiliated colors in a user interface.

2. The computer-implemented method of claim 1, wherein the rating comprises a number of votes.

3. The computer-implemented method of claim 1, wherein scaling the respective cumulative weight further comprises dividing the cumulative weight by the total number of the one or more affiliated color palettes having the affiliated color and the at least one of: the first color or the second color.

4. The computer-implemented method of claim 1 further comprising:
determining an affiliated color range based at least in part on a color distance from an affiliated color in the color space,
wherein calculating the cumulative weight of each affiliated color further comprises combining the ratings from the one or more affiliated color palettes that include a color that is within the affiliated color range.

5. The computer-implemented method of claim 4, wherein:
the rating comprises a number of votes, and
combining the rating comprises adding the number of votes.

6. The computer-implemented method of claim 5, wherein the presentation of the subset of affiliated colors comprises presentation of an affiliated color with a highest adjusted weight as first relative to other affiliated colors from the subset.

7. A computer-implemented method comprising:
under control of a hardware computing device configured with specific computer-executable instructions,
identifying one or more affiliated color palettes, wherein an affiliated color palette is a color palette having at least one of: a first color within a first input color range of a first input color in a color space or a second color within a second input color range of a second input color in the color space, each of the one or more affiliated color palettes having a rating, wherein identifying the one or more affiliated color palettes further comprises:
calculating an integer search range, wherein calculating the integer search range further comprises interleaving bits from at least one of the first input color range or the second input color range;
initiating a search of a data store based at least in part on a search query comprising the integer search range as a search parameter, the data store comprising a record associated with at least one indexed integer color value; and
receiving a search result from the data store, the search result comprising a first record associated with a first indexed integer color value for at least one of the first color or the second color, the first record further associated with a first color palette of the one or more affiliated color palettes;
identifying a plurality of affiliated colors in the one or more affiliated color palettes;
calculating a first cumulative weight and a second cumulative weight of each affiliated color of the plurality of affiliated colors, the first cumulative weight corresponding to a first aggregation of one or more ratings of the one or more affiliated color palettes having the affiliated color and the first color, the second cumulative weight corresponding to a second aggregation of one or more ratings of the one or more affiliated color palettes having the affiliated color and the second color;
calculating an adjusted weight of each affiliated color, wherein calculating the adjusted weight further comprises:
scaling a respective cumulative weight by a total number of the one or more affiliated color palettes having the affiliated color and at least one of: the first color or the second color; and
multiplying the first cumulative weight and the second cumulative weight;
selecting a subset of affiliated colors from the plurality of affiliated colors based at least in part on the adjusted weight of each affiliated color of the plurality of affiliated colors; and
providing the subset of the affiliated colors.

8. The computer-implemented method of claim 7, wherein the first input color is received from a user.

9. The computer-implemented method of claim 7, wherein the first input color is determined through analysis of an input image.

10. The computer-implemented method of claim 7, wherein the first input color is determined through analysis of a user profile, the user profile comprising purchase history, demographics, geographical location, or product preferences.

11. The computer-implemented method of claim 7, wherein the first input color range is determined using a human color distance formula.

12. The computer-implemented method of claim 7 further comprising selecting a color from the subset of affiliated colors to generate a custom color palette, the custom color palette including the first input color and the selected color.

13. The computer-implemented method of claim 12 further comprising identifying second affiliated color palettes, wherein a second affiliated color palette is a color palette having at least one of:
at least one color within an input color range of the first input color in the color space; or
at least one color within an input color range of the selected color in the color space.

14. The computer-implemented method of claim 7 further comprising:
analyzing ratings of the affiliated color palettes as a function of time; and
identifying one or more affiliated colors based at least in part on a trend in the ratings of the affiliated color palettes exhibited over time.

15. The computer-implemented method of claim 14, wherein analyzing ratings of the affiliated color palettes as a function of time comprises determining a directional shift exhibited over time in a color space.

16. The computer-implemented method of claim 7 further comprising:

selecting a first tentative color and a second tentative color from the at least a portion of the plurality of affiliated colors for which an order was determined;

providing a first tentative grouping of affiliated colors by identifying affiliated color palettes that include at least one color within the first input color range and at least one color within an input color range of the first tentative color in the color space; and providing a second tentative grouping of affiliated colors by identifying affiliated color palettes that include at least one color within the first input color range and at least one color within an input color range of the second tentative color in the color space.

17. A system comprising:

a data store configured to store computer-executable instructions; and a hardware processor in communication with the data store, the hardware processor configured to execute the computer-executable instructions to at least:

identify one or more affiliated color palettes, wherein an affiliated color palette is a color palette having at least one of: a first color within a first input color range of a first input color in a color space or a second color within a second input color range of a second input color in the color space, each of the one or more affiliated color palettes having a rating, wherein to identifying the one or more affiliated color palettes further comprises:

calculating an integer search range, wherein calculating the integer search range further comprises interleaving bits from at least one of the first input color range or the second input color range;

initiating a search of a data store based at least in part on a search query comprising the integer search range as a search parameter, the data store comprising a record associated with at least one indexed integer color value; and receiving a search result from the data store, the search result comprising a first record associated with a first indexed integer color value for at least one of the first color or the second color, the first record further associated with a first color palette of the one or more affiliated color palettes;

identify a plurality of affiliated colors from the one or more affiliated color palettes;

calculate a first cumulative weight and a second cumulative weight of each affiliated color of the plurality of affiliated colors, the first cumulative weight corresponding to a first aggregation of one or more ratings the of the one or more affiliated color palettes having the affiliated color and the first color, the second cumulative weight corresponding to a second aggregation of one or more ratings of the one or more affiliated color palettes having the affiliated color and the second color;

calculate an adjusted weight of each affiliated color, wherein calculating the adjusted weight further comprises:

scaling a respective cumulative weight by a total number of the one or more affiliated color palettes having the affiliated color and at least one of: the first color or the second color; and multiplying the first cumulative weight and the second cumulative weight;

select a subset of affiliated colors from the plurality of affiliated colors based at least in part on the adjusted weight of each affiliated color from the plurality of affiliated colors; and provide the subset of affiliated colors.

18. The system of claim 17, wherein scaling the respective cumulative weight further comprises dividing the cumulative weight by the total number of the one or more affiliated color palettes having the affiliated color and the at least one of: the first color or the second color.

19. The system of claim 17, wherein the rating of an affiliated color palette includes information about the rating determined for a geographical location.

20. A non-transitory computer readable storage medium storing computer-executable instructions that when executed by a processor perform operations comprising:

identifying one or more affiliated color palettes, wherein an affiliated color palette is a color palette having at least one of: a first color within a first input color range of a first input color in a color space or a second color within a second input color range of a second input color in the color space, each of the one or more affiliated color palettes having a rating, wherein identifying the one or more affiliated color palettes further comprises:

calculating an integer search range, wherein calculating the integer search range further comprises interleaving bits from at least one of the first input color range or the second input color range;

initiating a search of a data store based at least in part on a search query comprising the integer search range as a search parameter, the data store comprising a record associated with at least one indexed integer color value; and receiving a search result from the data store, the search result comprising a first record associated with a first indexed integer color value for at least one of the first color or the second color, the first record further associated with a first color palette of the one or more affiliated color palettes;

identifying a plurality of affiliated colors in the one or more affiliated color palettes;

calculating a first cumulative weight and a second cumulative weight of each affiliated color of the plurality of affiliated colors, the first cumulative weight corresponding to a first aggregation of one or more ratings of the one or more affiliated color palettes having the affiliated color and the first color, the second cumulative weight corresponding to a second aggregation of one or more ratings of the one or more affiliated color palettes having the affiliated color and the second color;

calculating an adjusted weight of each affiliated color, wherein calculating the adjusted weight further comprises:

scaling a respective cumulative weight by a total number of the one or more affiliated color palettes having the affiliated color and at least one of: the first color or the second color; and multiplying the first cumulative weight and the second cumulative weight;

selecting a subset of affiliated colors from the plurality of affiliated colors based at least in part on the adjusted weight of each affiliated color of the plurality of affiliated colors.

* * * * *